United States Patent
Yoshida

(10) Patent No.: US 11,757,557 B2
(45) Date of Patent: Sep. 12, 2023

(54) SUBCHANNEL ENCODING DEVICE, SUBCHANNEL DECODING DEVICE, SUBCHANNEL ENCODING METHOD, SUBCHANNEL DECODING METHOD, AND SUBCHANNEL MULTIPLEXING OPTICAL COMMUNICATION SYSTEM

(71) Applicant: Mitsubishi Electric Corporation, Tokyo (JP)

(72) Inventor: Tsuyoshi Yoshida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 117 days.

(21) Appl. No.: 17/547,584

(22) Filed: Dec. 10, 2021

(65) Prior Publication Data

US 2022/0103285 A1    Mar. 31, 2022

Related U.S. Application Data

(63) Continuation of application No. PCT/JP2019/029504, filed on Jul. 26, 2019.

(51) Int. Cl.
*H04B 10/25* (2013.01)
*H04J 14/02* (2006.01)
(Continued)

(52) U.S. Cl.
CPC ...... *H04J 14/0298* (2013.01); *H04B 10/2581* (2013.01); *H04L 27/26* (2013.01); *H04L 27/34* (2013.01)

(58) Field of Classification Search
CPC .................................................. H04J 14/0298
See application file for complete search history.

(56) References Cited

U.S. PATENT DOCUMENTS

| 7,558,315 B2 * | 7/2009 | Cioffi ..................... H04B 3/32 375/222 |
| 2005/0265730 A1 | 12/2005 | Yasue et al. |

(Continued)

FOREIGN PATENT DOCUMENTS

| JP | 2006-527573 A | 11/2006 |
| JP | 2015-126487 A | 7/2015 |

(Continued)

OTHER PUBLICATIONS

Böcherer et al., "Bandwidth Efficient and Rate-Matched Low-Density Parity-Check Coded Modulation", IEEE Transactions on Communications, Dec. 2015, vol. 63, No. 12, p. 4651-4665.

(Continued)

*Primary Examiner* — Tanya T Motsinger
(74) *Attorney, Agent, or Firm* — Birch, Stewart, Kolasch & Birch, LLP

(57) ABSTRACT

A subchannel encoding device is configured to include: a probability distribution shaping-encoding unit for dividing M×N (M is an integer of two or more, and N is an integer of one or more) subchannels into N groups, shaping a probability distribution of transmission modulation symbols of each group on the basis of signal-to-noise ratios of the M×N subchannels, and converting an information bit string into a shaped bit string corresponding to the probability distribution of the transmission modulation symbols of each group; a subchannel signal generating unit for generating each subchannel signal in the M×N subchannels from the shaped bit string; and a signal multiplexing unit for multiplexing the M×N subchannel signals generated by the subchannel signal generating unit to generate a subchannel multiplexed signal.

3 Claims, 12 Drawing Sheets

(51) Int. Cl.
  *H04B 10/2581* (2013.01)
  *H04L 27/26* (2006.01)
  *H04L 27/34* (2006.01)

(56) References Cited

U.S. PATENT DOCUMENTS

| | | | |
|---|---|---|---|
| 2015/0188638 A1 | 7/2015 | Tanaka et al. | |
| 2017/0134115 A1 | 5/2017 | Nomura et al. | |
| 2018/0124146 A1* | 5/2018 | Chen | H04L 65/61 |
| 2018/0145806 A1 | 5/2018 | Liu et al. | |
| 2020/0177204 A1* | 6/2020 | Abotabl | H03M 13/255 |
| 2021/0135778 A1 | 5/2021 | Yoshida | |
| 2021/0243058 A1* | 8/2021 | Doan | H04L 1/0063 |
| 2021/0281450 A1 | 9/2021 | Binkai et al. | |
| 2021/0383207 A1* | 12/2021 | Beery | G06N 3/047 |
| 2021/0383220 A1* | 12/2021 | Beery | H03M 13/6597 |
| 2022/0103285 A1* | 3/2022 | Yoshida | H04L 27/34 |
| 2023/0132851 A1* | 5/2023 | Fludger | H04J 14/0298 398/76 |
| 2023/0135699 A1* | 5/2023 | Liao | H04W 28/0268 370/252 |

FOREIGN PATENT DOCUMENTS

| | | | |
|---|---|---|---|
| JP | 2017-92739 A | 5/2017 | |
| JP | 2018-85717 A | 5/2018 | |
| WO | WO 2018/167920 A1 | 9/2018 | |
| WO | WO 2020/031257 A1 | 2/2020 | |
| WO | WO 2020/174574 A1 | 9/2020 | |

OTHER PUBLICATIONS

Che et al., "Approaching the Capacity of Colored-SNR Optical Channels by Multicarrier Entropy Loading", Journal of Lightwave Technology, Jan. 1, 2018, vol. 36, No. 1, p. 68-78.

Chen et al., "Uniform Entropy Loading for Precoded DMT Systems in Fading Optical Channel", IEEE, [online], 2018 Asia Communications and Photonics Conference(ACP), Dec. 2018, (URL:https://ieeexplore.ieee.org/stamp/stamp.jsp?tp=&arnumber=8595905), total 3 pages.

International Search Report, issued in PCT/JP2019/029504, PCT/ISA/210, dated Sep. 10, 2019.

Yoshida et al., "Hierarchical Distribution Matching for Probabilistically Shaped Coded Modulation", Journal of Lightwave Technology, Mar. 15, 2019, vol. 37, No. 6, p. 1579-1589.

Yoshida et al., "Technologies Toward Implementation of Probabilistic Constellation Shaping", [online], 2018 European Conference on Optical Communication (ECDC), Nov. 2018, (URL:https://ieeexplore.ieee.org/stamp/stamp.jsp?tp=&arnumber=8535228), total 3 pages.

* cited by examiner

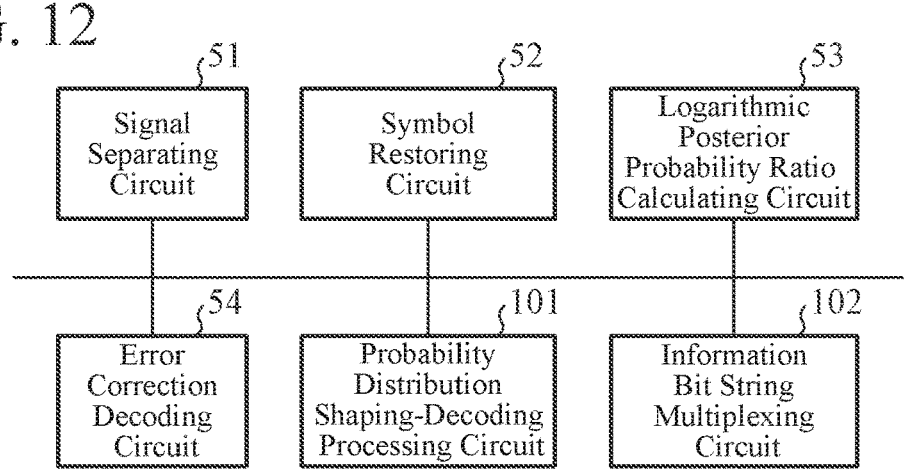
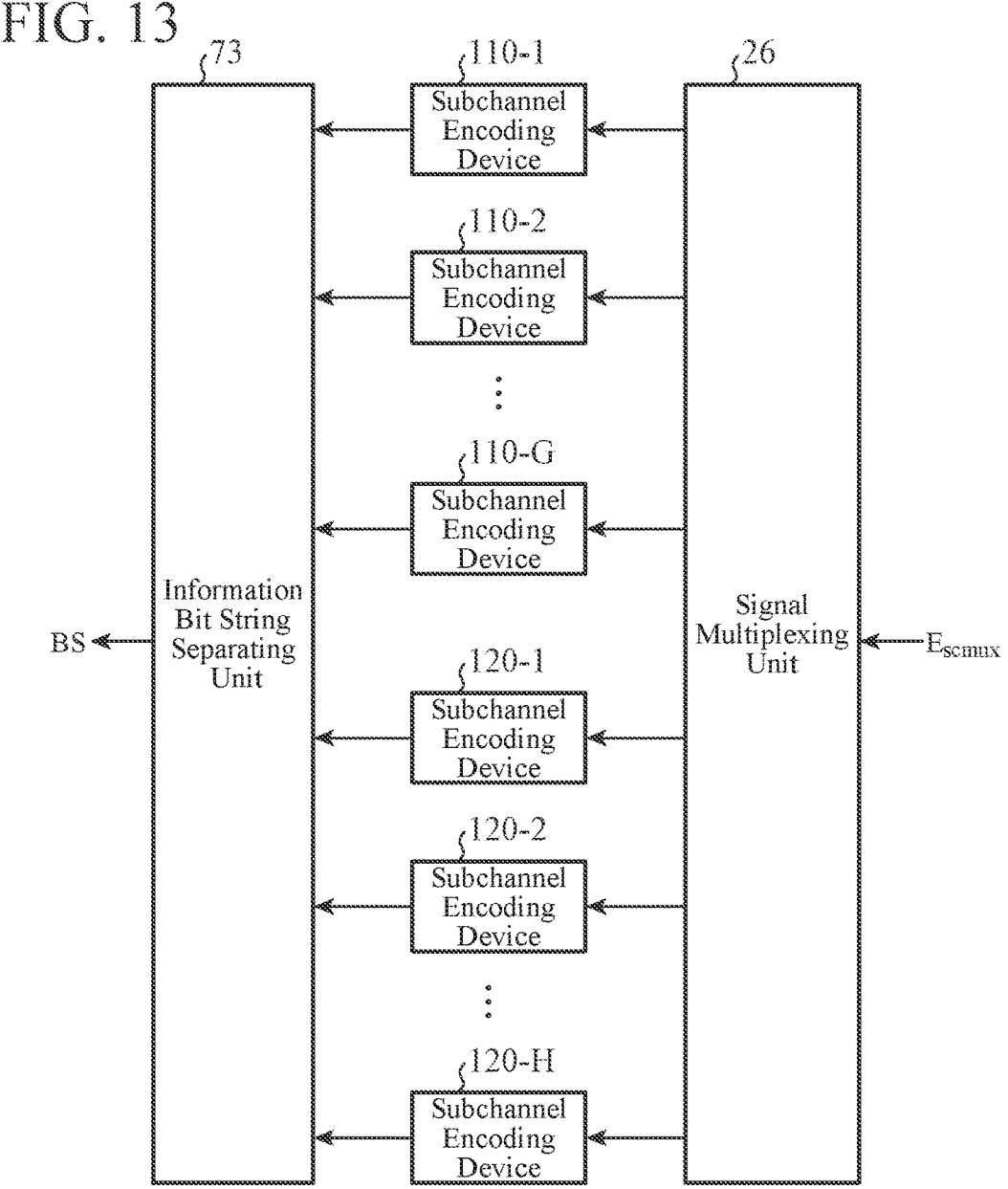

SUBCHANNEL ENCODING DEVICE, SUBCHANNEL DECODING DEVICE, SUBCHANNEL ENCODING METHOD, SUBCHANNEL DECODING METHOD, AND SUBCHANNEL MULTIPLEXING OPTICAL COMMUNICATION SYSTEM

CROSS REFERENCE TO RELATED APPLICATIONS

This application is a Continuation of PCT International Application No. PCT/JP2019/029504 filed on Jul. 26, 2019, which is hereby expressly incorporated by reference into the present application.

TECHNICAL FIELD

The present invention relates to a subchannel encoding device and a subchannel encoding method for generating a subchannel multiplexed signal, a subchannel decoding device and a subchannel decoding method for restoring an information bit string, and a subchannel multiplexing optical communication system including the subchannel encoding device and the subchannel decoding device.

BACKGROUND ART

An optical communication system that transmits an information bit string using an optical fiber may perform shaping encoding, which is shaping of the information bit string, in order to increase an information rate, which is the number of communicable information bits per time and space. The shaping encoding process is a process of converting the information bit string into a bit string corresponding to a probability distribution of transmission modulation symbols after the shaping so as to shape the probability distribution of the transmission modulation symbols into a desired distribution.

In addition, the above-described optical communication system may divide and multiplex an information bit string into a plurality of subchannels and transmit the information bit string in order to achieve a high throughput. Signal to noise ratios (SNRs) in a plurality of subchannels may be different from each other.

Non-Patent Literature 1 below discloses a method for determining entropy for each subchannel in accordance with the SNR of each subchannel in order to increase the information rate in the total of a plurality of subchannels having SNRs different from each other. The entropy is an upper limit value of the information rate.

CITATION LIST

Non-Patent Literature

Non-Patent Literature 1: D. Che et al., "Approaching the Capacity of Colored-SNR Optical Channels by Multicarrier Entropy Loading" Journal of Lightwave Technology, vol. 36, no. 1, pp. 68-78, January 2018.

SUMMARY OF INVENTION

Technical Problem

If a probability distribution shaping-encoding unit that is a circuit for performing shaping encoding is provided in each subchannel, the information rate in the total of a plurality of subchannels can be increased by the method disclosed in Non-Patent Literature 1. However, in the configuration in which the probability distribution shaping-encoding unit is provided in each subchannel, as the number of subchannels increases, the number of mounting of probability distribution shaping-encoding units increases, and there is a problem that the circuit scale increases.

The present invention has been made to solve the above problem, and an object thereof is to obtain a subchannel encoding device capable of increasing an information rate in total of a plurality of subchannels without implementing the probability distribution shaping-encoding units as many as the plurality of subchannels.

Solution to Problem

A subchannel encoding device according to the present invention includes: processing circuitry performing a process of: separating one information bit string into an information bit string belonging to each of groups wherein M×N (M and N are an integer of two or more) subchannels are classified into N groups; providing N probability distribution shaping-encoding processors to shape a probability distribution of transmission modulation symbols corresponding to the information bit string belonging to each group separated on a basis of signal-to-noise ratios of the M×N subchannels, and to convert the information bit string belonging to each group into a shaped bit string corresponding to the probability distribution of the shaped transmission modulation symbols; generating each subchannel signal in the M×N subchannels from the N shaped bit strings; and multiplexing the M×N subchannel signals generated to generate a subchannel multiplexed signal.

Advantageous Effects of Invention

According to the present invention, it is possible to increase the information rate in the total of the plurality of subchannels without implementing the probability distribution shaping-encoding units as many as the M×N subchannels.

BRIEF DESCRIPTION OF DRAWINGS

FIG. 6 is a hardware configuration diagram of a computer in a case where the subchannel encoding device 11 or the subchannel decoding device 18 is implemented by software, firmware, or the like.

FIG. 12 is a hardware configuration diagram illustrating hardware of the subchannel decoding device 18 according to the second embodiment.

FIG. 13 is a configuration diagram illustrating a subchannel encoding device 11 according to a third embodiment.

DESCRIPTION OF EMBODIMENTS

Hereinafter, in order to explain this invention in more detail, embodiments for carrying out this invention will be described with reference to the accompanying drawings.

First Embodiment

Figure 1:
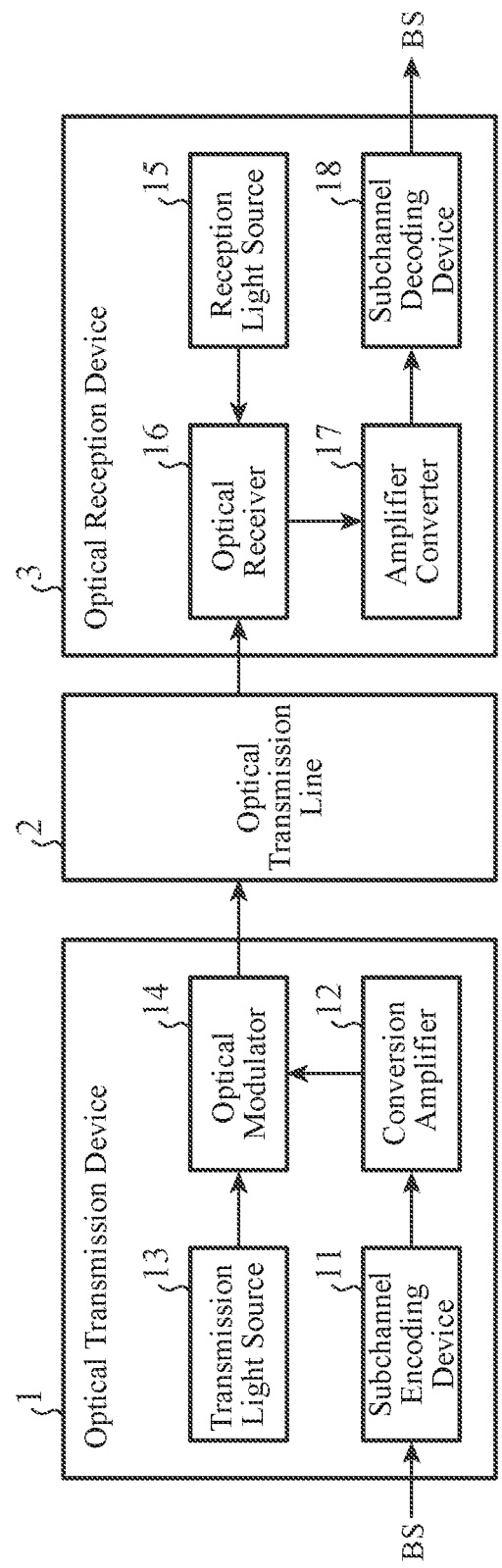
FIG. 1 is a configuration diagram illustrating a subchannel multiplexing optical communication system according to a first embodiment.

FIG. 1 is a configuration diagram illustrating a subchannel multiplexing optical communication system according to the first embodiment.

The subchannel multiplexing optical communication system includes an optical transmission device 1, an optical transmission line 2, and an optical reception device 3.

The optical transmission device 1 includes a subchannel encoding device 11, a conversion amplifier 12, a transmission light source 13, and an optical modulator 14.

The subchannel encoding device 11 is a subchannel encoding device illustrated in FIG. 2 described later.

The subchannel encoding device 11 generates M×N (M is an integer of two or more, and N is an integer of one or more) subchannel signals from an information bit string BS.

The subchannel encoding device 11 multiplexes the generated M×N subchannel signals to generate a subchannel multiplexed signal, and outputs the subchannel multiplexed signal to the conversion amplifier 12.

The conversion amplifier 12 converts the subchannel multiplexed signal output from the subchannel encoding device 11 from a digital signal to an analog signal and amplifies the analog signal.

The conversion amplifier 12 outputs the amplified analog signal to the optical modulator 14.

The transmission light source 13 oscillates unmodulated light having a center wavelength of 1550 nm, for example, and outputs the oscillated unmodulated light to the optical modulator 14.

The optical modulator 14 is implemented by, for example, a polarization multiplexed quadrature phase modulator.

The optical modulator 14 generates an optical signal by modulating the unmodulated light output from the transmission light source 13 in accordance with the amplified analog signal output from the conversion amplifier 12.

The optical modulator 14 outputs the generated optical signal to the optical transmission line 2.

The optical transmission line 2 includes an optical cross-connect, a transmission optical fiber, an optical amplifier, and the like.

The optical cross-connect is implemented by a wavelength selective switch, an optical coupler, a wavelength separator, a wavelength multiplexer, or the like.

The transmission optical fiber is implemented by a single-mode fiber, a spatially multiplexing fiber, or the like.

The optical amplifier is implemented by, for example, an erbium-doped optical amplifier or a Raman optical amplifier.

The optical transmission line 2 is connected between the optical modulator 14 of the optical transmission device 1 and an optical receiver 16 described later of the optical reception device 3.

The optical transmission line 2 transmits the optical signal output from the optical modulator 14.

The optical reception device 3 includes a reception light source 15, an optical receiver 16, an amplifier converter 17, and a subchannel decoding device 18.

The reception light source 15 oscillates unmodulated light having a center wavelength of 1550 nm, for example, and outputs the oscillated unmodulated light to the optical receiver 16.

The optical receiver 16 coherently detects the optical signal transmitted by the optical transmission line 2 using the unmodulated light output from the reception light source 15.

The optical receiver 16 outputs an electrical signal indicating a coherent detection result of the optical signal to the amplifier converter 17.

The amplifier converter 17 amplifies the electrical signal output from the optical receiver 16 and converts the amplified electrical signal from an analog signal to a digital signal.

The amplifier converter 17 outputs the digital signal as a subchannel multiplexed signal to the subchannel decoding device 18.

The subchannel decoding device 18 is a subchannel decoding device illustrated in FIG. 4 described below.

The subchannel decoding device 18 receives the subchannel multiplexed signal output from the amplifier converter 17 and separates the subchannel multiplexed signal into M×N subchannel signals.

The subchannel decoding device 18 restores the information bit string BS from the separated M×N subchannel signals.

Figure 2:
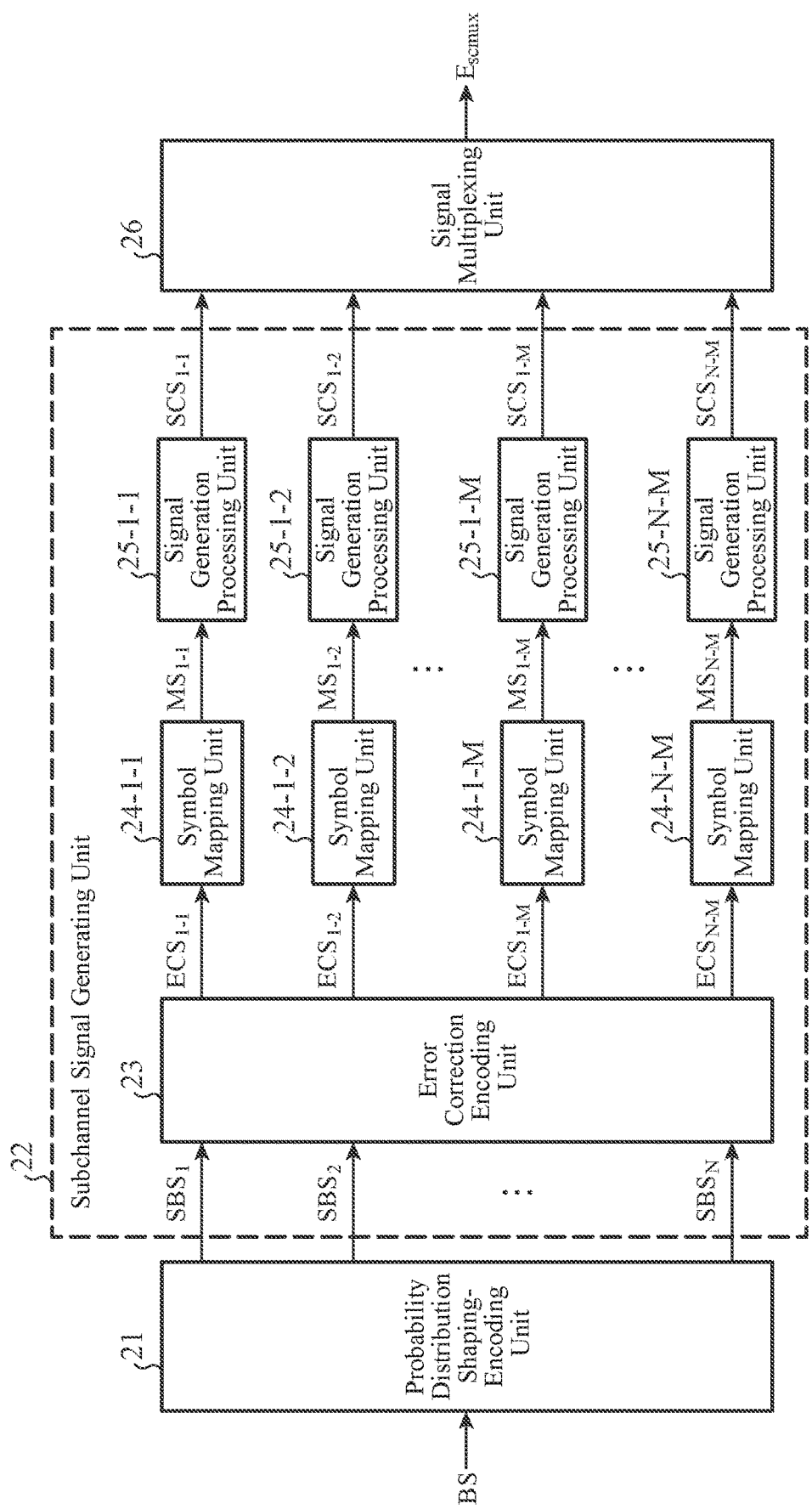
FIG. 2 is a configuration diagram illustrating a subchannel encoding device 11 according to the first embodiment.

FIG. 2 is a configuration diagram illustrating the subchannel encoding device 11 according to the first embodiment.

Figure 3:
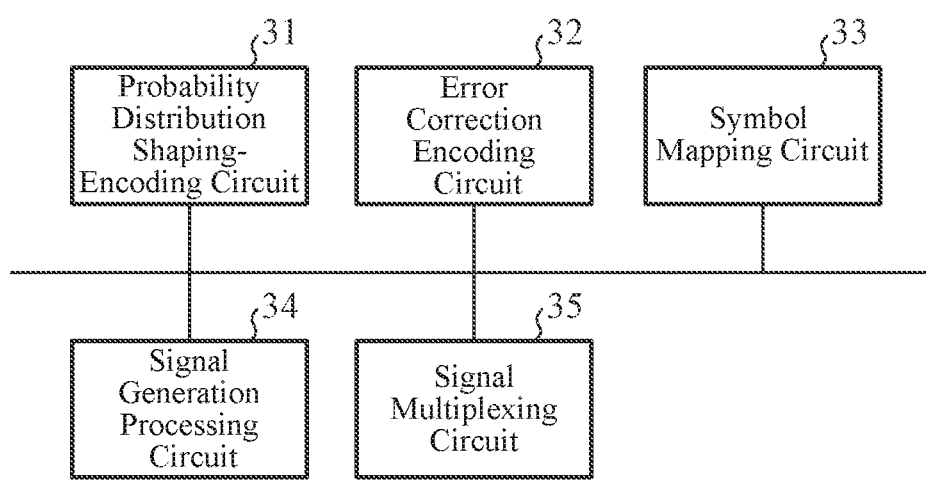
FIG. 3 is a hardware configuration diagram illustrating hardware of the subchannel encoding device 11 according to the first embodiment.

FIG. 3 is a hardware configuration diagram illustrating hardware of the subchannel encoding device 11 according to the first embodiment.

In FIG. 2, a probability distribution shaping-encoding unit 21 is implemented by, for example, a probability distribution shaping-encoding circuit 31 illustrated in FIG. 3.

The probability distribution shaping-encoding unit 21 divides the M×N subchannels $SC_1$ to $SC_{M\times N}$ into N groups, and shapes the probability distribution of the transmission modulation symbols of each group on the basis of the SNRs of the M×N subchannels $SC_1$ to $SC_{M\times N}$. In addition, the probability distribution shaping-encoding unit 21 converts the input information bit string BS into N shaped bit strings. Hereinafter, each probability distribution obtained by sample averaging the transmission modulation symbols generated by symbol mapping units 24-$n$-1 to 24-$n$-M described later on the basis of the shaped bit string is referred to as $PD_n$. n=1, 2, . . . , N. Sample average means time average.

The SNRs of the subchannels $SC_1$ to $SC_{M\times N}$ may be stored in the internal memory of the probability distribution shaping-encoding unit 21, or may be provided from the outside of the device, for example.

The probability distribution shaping-encoding unit 21 converts the information bit string BS into N shaped bit strings $SBS_1$ to $SBS_N$ corresponding to the probability distributions $PD_1$ to $PD_N$ of the transmission modulation symbols.

The probability distribution shaping-encoding unit 21 outputs the N shaped bit strings $SBS_1$ to $SBS_N$ to an error correction encoding unit 23 of a subchannel signal generating unit 22 described later.

The subchannel signal generating unit 22 includes an error correction encoding unit 23, the symbol mapping units 24-1-1 to 24-N-M, and signal generation processing units 25-1-1 to 25-N-M.

The subchannel signal generating unit 22 generates the subchannel signals $SCS_{1-1}$ to $SCS_{N-M}$ in the M×N subchannels $SC_1$ to $SC_{M \times N}$ from the shaped bit strings $SBS_1$ to $SBS_N$.

The error correction encoding unit 23 is implemented by, for example, an error correction encoding circuit 32 illustrated in FIG. 3.

The error correction encoding unit 23 adds a parity bit $pb_n$ as a redundant bit to the shaped bit string $SBS_n$ (n=N) output from the probability distribution shaping-encoding unit 21 to generate an error correction encoding bit string $ECS_n$ including an error correction code.

The error correction encoding unit 23 separates the error correction encoding bit string $ECS_n$ into M error correction encoding bit strings $ECS_{n-1}$ to $ECS_{n-M}$.

The error correction encoding unit 23 outputs the separated M×N error correction encoding bit strings $ECS_{1-1}$ to $ECS_{N-M}$ to the symbol mapping units 24-1-1 to 24-N-M, respectively.

Each of the symbol mapping units 24-1-1 to 24-N-M is implemented by, for example, a symbol mapping circuit 33 illustrated in FIG. 3.

The symbol mapping unit 24-$n$-$m$ (n=1, . . . , N; m=1, . . . , M) generates a transmission modulation symbol $MS_{n-m}$ from the error correction encoding bit string $ECS_{n-m}$ separated by the error correction encoding unit 23.

The symbol mapping unit 24-$n$-$m$ outputs the transmission modulation symbol $MS_{n-m}$ to the signal generation processing unit 25-$n$-$m$.

Each of the signal generation processing units 25-1 to 25-N-M is implemented by, for example, a signal generation processing circuit 34 illustrated in FIG. 3.

The signal generation processing unit 25-$n$-$m$ generates a subchannel signal $SCS_{n-m}$ from the transmission modulation symbol $MS_{n-m}$ generated by the symbol mapping unit 24-$n$-$m$.

The signal generation processing unit 25-$n$-$m$ outputs the generated subchannel signal $SCS_{n-m}$ to the signal multiplexing unit 26 described later.

The signal multiplexing unit 26 is implemented by, for example, a signal multiplexing circuit 35 illustrated in FIG. 3.

The signal multiplexing unit 26 multiplexes the subchannel signals $SCS_{1-1}$ to $SCS_{N-M}$ generated by the signal generation processing units 25-1-1 to 25-N-M to generate a subchannel multiplexed signal $E_{scmux}$.

The signal multiplexing unit 26 outputs the generated subchannel multiplexed signal $E_{scmux}$ to the conversion amplifier 12.

Figure 4:
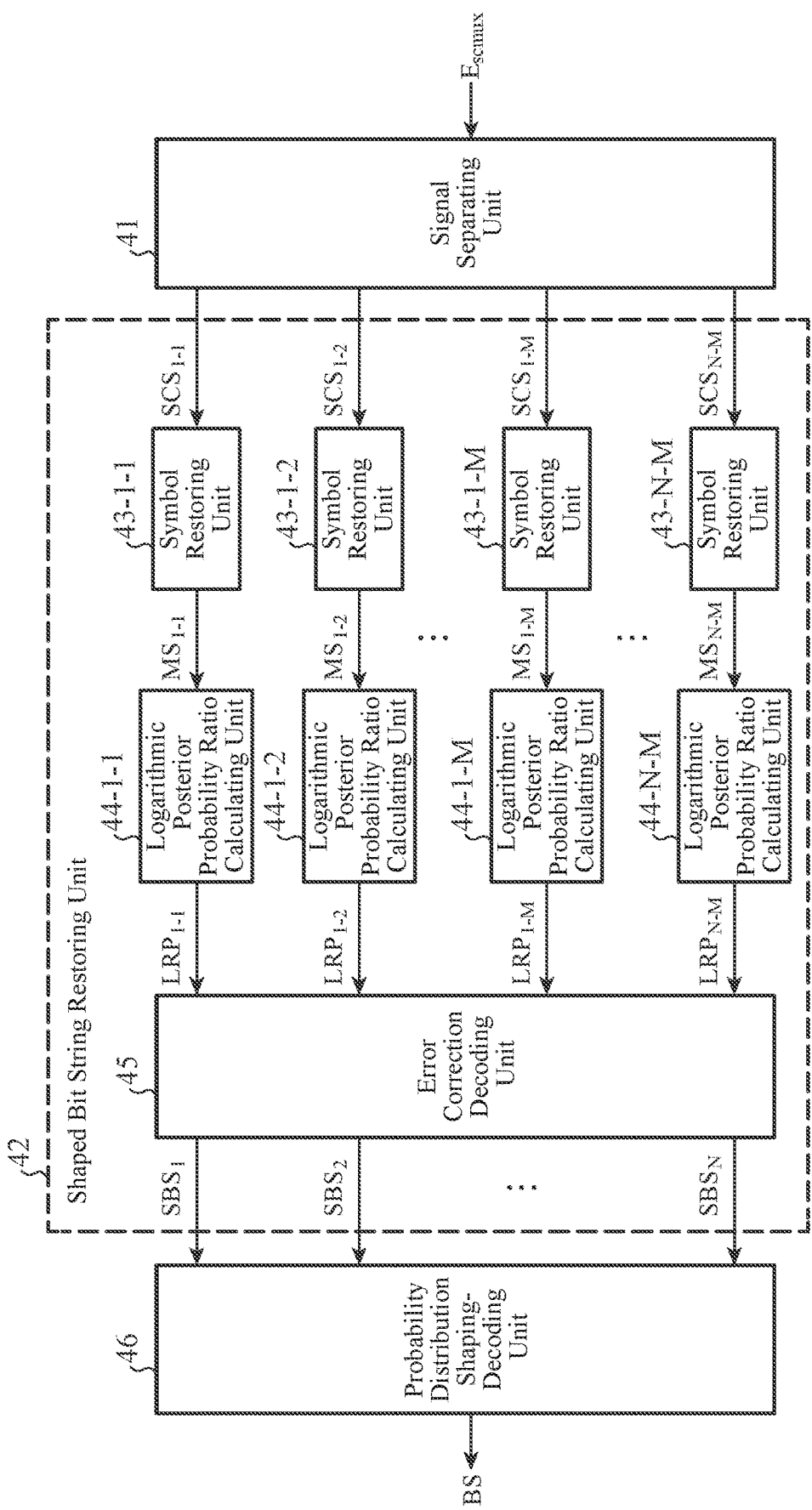
FIG. 4 is a configuration diagram illustrating a subchannel decoding device 18 according to the first embodiment.

FIG. 4 is a configuration diagram illustrating the subchannel decoding device 18 according to the first embodiment.

Figure 5:
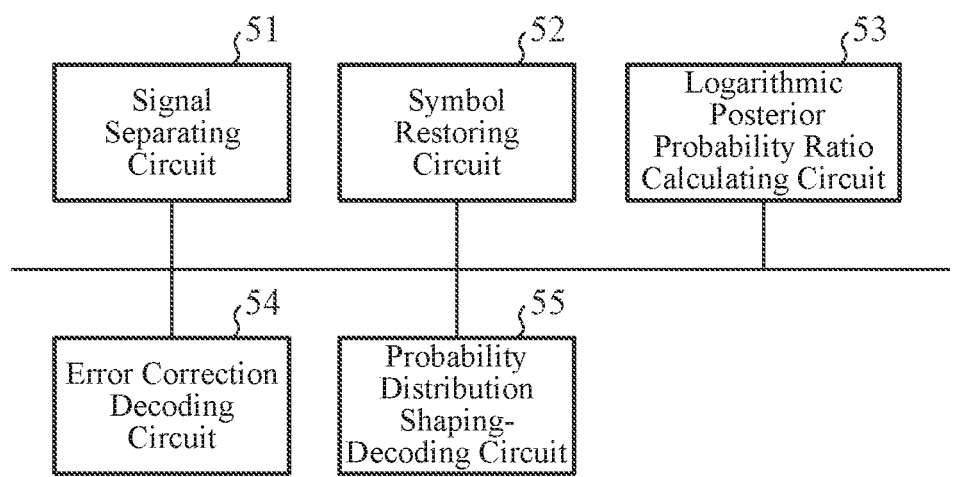
FIG. 5 is a hardware configuration diagram illustrating hardware of the subchannel decoding device 18 according to the first embodiment.

FIG. 5 is a hardware configuration diagram illustrating hardware of the subchannel decoding device 18 according to the first embodiment.

In FIG. 4, a signal separating unit 41 is implemented by, for example, a signal separating circuit 51 illustrated in FIG. 5.

The signal separating unit 41 receives the subchannel multiplexed signal $E_{scmux}$ output from the amplifier converter 17.

The signal separating unit 41 separates the received subchannel multiplexed signal $E_{scmux}$ into M×N subchannel signals $SCS_{1-1}$ to $SCS_{N-M}$.

The signal separating unit 41 outputs the separated subchannel signals $SCS_{1-1}$ to $SCS_{N-M}$ to respective symbol restoring units 43-1-1 to 43-N-M of a shaped bit string restoring unit 42 to be described later.

The shaped bit string restoring unit 42 includes symbol restoring units 43-1-1 to 43-N-M, logarithmic posterior probability ratio calculating units 44-1-1 to 44-N-M, and an error correction decoding unit 45.

The shaped bit string restoring unit 42 restores the N shaped bit strings $SBS_1$ to $SBS_N$ from the M×N subchannel signals $SCS_{1-1}$ to $SCS_{N-M}$ separated by the signal separating unit 41.

Each of the symbol restoring units 43-1-1 to 43-N-M is implemented by, for example, a symbol restoring circuit 52 illustrated in FIG. 5.

The symbol restoring unit 43-$n$-$m$ restores the modulation symbol $MS_{n-m}$ from the subchannel signal $SCS_{n-m}$ output from the signal separating unit 41.

The symbol restoring unit 43-$n$-$m$ outputs the restored modulation symbol $MS_{n-m}$ to the logarithmic posterior probability ratio calculating unit 44-$n$-$m$.

Each of the logarithmic posterior probability ratio calculating units 44-1-1 to 44-N-M is implemented by, for example, a logarithmic posterior probability ratio calculating circuit 53 illustrated in FIG. 5.

The logarithmic posterior probability ratio calculating unit 44-$n$-$m$ calculates a posterior L value (hereinafter referred to as "$LRP_{n-m}$"), which is a logarithmic posterior probability ratio, from the modulation symbol $MS_{n-m}$ restored by the symbol restoring unit 43-$n$-$m$. LRP stands for "Logarithmic Ratio of a posteriori Probabilities".

The logarithmic posterior probability ratio calculating unit 44-$n$-$m$ outputs the calculated $LRP_{n-m}$ to the error correction decoding unit 45.

The error correction decoding unit 45 is implemented by, for example, an error correction decoding circuit 54 illustrated in FIG. 5.

The error correction decoding unit 45 restores the shaped bit strings $SBS_1$ to $SBS_N$ from the $LRP_{1-1}$ to $LRP_{N-M}$ calculated by the logarithmic posterior probability ratio calculating units 44-1-1 to 44-N-M.

The error correction decoding unit 45 outputs the restored shaped bit strings $SBS_1$ to $SBS_N$ to the probability distribution shaping-decoding unit 46.

The probability distribution shaping-decoding unit 46 is implemented by, for example, a probability distribution shaping-decoding circuit 55 illustrated in FIG. 5.

The probability distribution shaping-decoding unit 46 converts the shaped bit strings $SBS_1$ to $SBS_N$ output from the error correction decoding unit 45 into an information bit string BS, and outputs the information bit string BS to the outside of the device.

The conversion into the information bit string BS by the probability distribution shaping-decoding unit 46 means that the shaping of the shaped bit strings $SBS_1$ to $SBS_N$ is terminated and the information bit string BS is restored.

In FIG. 2, it is assumed that each of the probability distribution shaping-encoding unit 21, the error correction encoding unit 23, the symbol mapping units 24-1-1 to 24-N-M, the signal generation processing units 25-1-1 to 25-N-M, and the signal multiplexing unit 26, which are components of the subchannel encoding device 11, is implemented by dedicated hardware as illustrated in FIG. 3. That is, it is assumed that the subchannel encoding device 11 is implemented by the probability distribution shaping-encoding circuit 31, the error correction encoding circuit 32, the symbol mapping circuit 33, the signal generation processing circuit 34, and the signal multiplexing circuit 35.

Each of the probability distribution shaping-encoding circuit 31, the error correction encoding circuit 32, the symbol mapping circuit 33, the signal generation processing circuit 34, and the signal multiplexing circuit 35 corresponds, for example, to a single circuit, a composite circuit, a programmed processor, a parallel-programmed processor, an application specific integrated circuit (ASIC), a field-programmable gate array (FPGA), or a combination thereof.

The components of the subchannel encoding device 11 are not limited to those implemented by dedicated hardware, but the subchannel encoding device 11 may be implemented by software, firmware, or a combination of software and firmware.

The software or firmware is stored in a memory of a computer as a program. The computer means hardware that executes a program, and corresponds to, for example, a central processing unit (CPU), a central processing unit, a processing unit, an arithmetic unit, a microprocessor, a microcomputer, a processor, or a digital signal processor (DSP).

Figure 6:
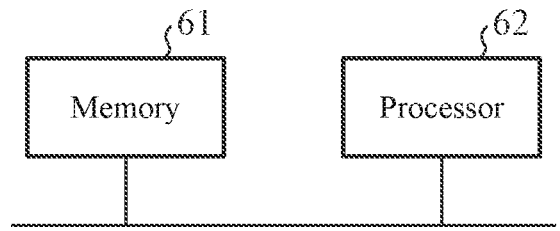

FIG. 6 is a hardware configuration diagram of a computer in a case where the subchannel encoding device 11 or the subchannel decoding device 18 is implemented by software, firmware, or the like.

In a case where the subchannel encoding device 11 is implemented by software, firmware, or the like, a program for causing a computer to execute processing procedures performed by the probability distribution shaping-encoding unit 21, the error correction encoding unit 23, the symbol mapping units 24-1-1 to 24-N-M, the signal generation processing units 25-1-1 to 25-N-M, and the signal multiplexing unit 26 is stored in a memory 61. Then, a processor 62 of the computer executes the program stored in the memory 61.

Furthermore, FIG. 3 illustrates an example in which each of the components of the subchannel encoding device 11 is implemented by dedicated hardware, and FIG. 6 illustrates an example in which the subchannel encoding device 11 is implemented by software, firmware, or the like. However, this is merely an example, and some components in the subchannel encoding device 11 may be implemented by dedicated hardware, and the remaining components may be implemented by software, firmware, or the like.

In FIG. 4, it is assumed that each of the signal separating unit 41, the symbol restoring units 43-1-1 to 43-N-M, the logarithmic posterior probability ratio calculating units 44-1-1 to 44-N-M, the error correction decoding unit 45, and the probability distribution shaping-decoding unit 46, which are components of the subchannel decoding device 18, is implemented by dedicated hardware as illustrated in FIG. 5. That is, it is assumed that the subchannel decoding device 18 is implemented by the signal separating circuit 51, the symbol restoring circuit 52, the logarithmic posterior probability ratio calculating circuit 53, the error correction decoding circuit 54, and the probability distribution shaping-decoding circuit 55.

Here, each of the signal separating circuit 51, the symbol restoring circuit 52, the logarithmic posterior probability ratio calculating circuit 53, the error correction decoding circuit 54, and the probability distribution shaping-decoding circuit 55 corresponds to, for example, a single circuit, a composite circuit, a programmed processor, a parallel-programmed processor, ASIC, FPGA, or a combination thereof.

The components of the subchannel decoding device 18 are not limited to those implemented by dedicated hardware, but the subchannel decoding device 18 may be implemented by software, firmware, or a combination of software and firmware.

In a case where the subchannel decoding device 18 is implemented by software, firmware, or the like, a program for causing a computer to execute processing procedures performed by the signal separating unit 41, the symbol restoring unit 43-1-1 to 43-N-M, the logarithmic posterior probability ratio calculating units 44-1-1 to 44-N-M, the error correction decoding unit 45, and the probability distribution shaping-decoding unit 46 is stored in the memory 61 illustrated in FIG. 6. Then, the processor 62 illustrated in FIG. 6 executes the program stored in the memory 61.

Furthermore, FIG. 5 illustrates an example in which each of the components of the subchannel decoding device 18 is implemented by dedicated hardware, and FIG. 6 illustrates an example in which the subchannel decoding device 18 is implemented by software, firmware, or the like. However, this is merely an example, and some components in the subchannel decoding device 18 may be implemented by dedicated hardware, and the remaining components may be implemented by software, firmware, or the like.

Next, an operation of the subchannel multiplexing optical communication system illustrated in FIG. 1 will be described.

The optical transmission line 2 is an optical transmission line that transmits an optical signal comprising M×N subchannels, and transmission characteristics of light in the M×N subchannels may be different from each other. Therefore, the SNRs in the M×N subchannels may be different from each other. The noise component in defining the SNR approximately includes a component that is not pure noise, such as distortion of a signal component due to nonlinearity in each of the optical device and the electrical device, interference with another channel or another subchannel, and a quantization error.

For example, it is assumed that M×N=8, the subchannels $SC_1$ to $SC_8$ are transmitted in the optical transmission line 2, the center frequencies $f_1$ to $f_8$ in the subchannels $SC_1$ to $SC_8$ are at equal intervals, and $f_1<f_2<\ldots f_7<f_8$.

In this case, if the entropy given to each of the subchannels $SC_1$ to $SC_8$ is determined depending on each SNR in the subchannels $SC_1$ to $SC_8$, it is possible to increase the total information rate of the subchannels $SC_1$ to $SC_8$, or it is possible to increase noise resistance at the same information rate. The entropy is obtained from a probability distribution of transmission modulation symbols.

However, in order to determine each entropy in the subchannels $SC_1$ to $SC_8$ depending on each SNR in the subchannels $SC_1$ to $SC_8$ assuming any channel condition, the subchannel encoding device 11 needs to mount the same number of probability distribution shaping-encoding units as the subchannels $SC_1$ to $SC_8$. In addition, the subchannel decoding device 18 needs to mount the same number of probability distribution shaping-decoding units as the subchannels $SC_1$ to $SC_8$.

For example, a case is assumed in which the subchannels $SC_1$ to $SC_8$ are grouped, and the entropy given to each of the subchannels $SC_1$ to $SC_8$ is determined in accordance with an average value or a median value of SNRs in each group.

For example, considering a case of multistage transmission of the optical cross-connect device, among the SNRs of the M×N subchannels, the SNR of the subchannel having the k-th highest center frequency counted from the subchannel having the lowest center frequency and the SNR of the subchannel having the k-th lowest center frequency counted from the subchannel having the highest center frequency are substantially the same due to the optical filter characteristic. k=1, 2, . . . , M×N.

In the assumed case, an information rate or noise resistance equivalent to that in a case where entropy is determined depending on each SNR in the subchannels $SC_1$ to $SC_8$ may not be obtained. However, even if the SNRs in the subchannels $SC_1$ to $SC_8$ are different from each other, grouping the subchannels $SC_1$ to $SC_8$ into several groups enables grouping in which the difference in SNR does not become extremely large in each group. Therefore, in the assumed case, the total information rate of the subchannels $SC_1$ to $SC_8$ is not greatly deteriorated as compared with the case of determining the entropy in the subchannels $SC_1$ to $SC_8$ depending on the SNRs in the subchannels $SC_1$ to $SC_8$. In the assumed case, the total information rate of the subchannels $SC_1$ to $SC_8$ can be increased as compared with the case where the probability distribution shaping unit is not provided at all or the case where subchannel separation is not performed.

For example, in a case where the M×N subchannels are divided into N groups and the entropy in each of the subchannels $SC_1$ to $SC_8$ is determined according to the average value of the SNRs in each group or the median value of the SNRs in each group, the subchannel encoding device 11 may mount one probability distribution shaping-encoding unit 21 that generates N groups of shaped bit strings. In addition, the subchannel decoding device 18 only needs to mount one probability distribution shaping-decoding unit 46 that performs processing opposite to the probability distribution shaping-encoding unit 21.

Therefore, in the assumed case, it is possible to increase the total information rate of the subchannels $SC_1$ to $SC_8$ by mounting a smaller number of probability distribution shaping-encoding units and probability distribution shaping-decoding units than that of the subchannels $SC_1$ to $SC_8$.

Figure 7:
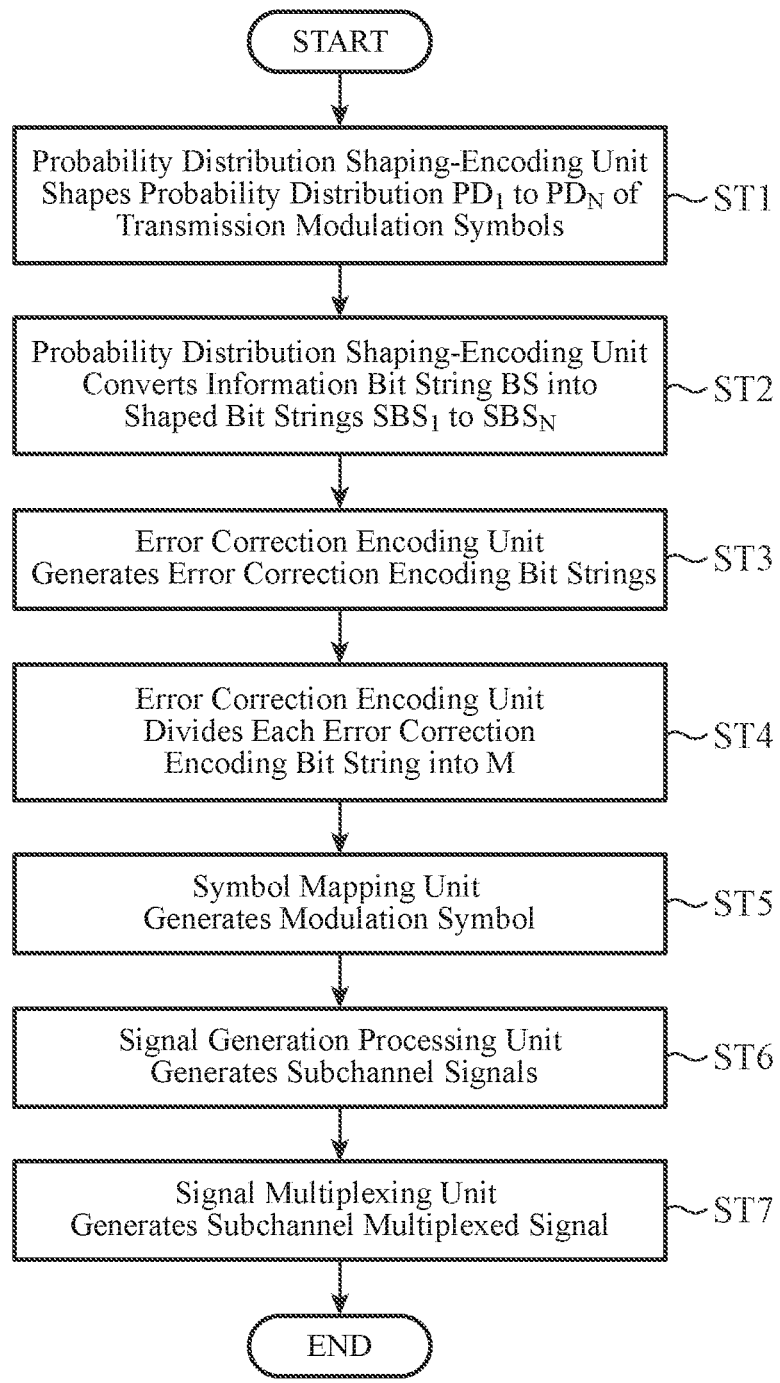
FIG. 7 is a flowchart illustrating a subchannel encoding method which is a processing procedure performed by the subchannel encoding device 11 according to the first embodiment.

FIG. 7 is a flowchart illustrating a subchannel encoding method which is a processing procedure performed by the subchannel encoding device 11 according to the first embodiment.

Hereinafter, the operation of the subchannel encoding device 11 illustrated in FIG. 2 will be described with reference to FIG. 7.

The probability distribution shaping-encoding unit 21 determines each of the information rate and the entropy of the transmission modulation symbol for each of the N groups on the basis of the SNRs of the M×N subchannels $SC_1$ to $SC_{M \times N}$.

In addition, the probability distribution shaping-encoding unit 21 shapes the probability distributions $PD_1$ to $PD_N$ of the transmission modulation symbols on the basis of the SNRs of the M×N subchannels $SC_1$ to $SC_{M \times N}$ (step ST1 in FIG. 7).

The processing of converting the information bit string into the shaped bit string corresponding to the transmission modulation symbol string subjected to the probability distribution shaping-encoding (Distribution Matching) is disclosed in Non-Patent Literature 2 below, for example, and is a known technique. Note that, Non-Patent Literature 2 does not disclose a specific method of determining the probability distribution $PD_n$ (n=1, 2, . . . , N) of the N groups of transmission modulation symbols on the basis of the SNRs of the M×N subchannels $SC_1$ to $SC_{M \times N}$, and a specific method of converting the information bit string into the shaped bit strings $SBS_1$ to $SBS_n$ of the plurality of subchannels corresponding to the determined probability distribution $PD_n$ of the transmission modulation symbols of the plurality of subchannels.

Non-Patent Literature 2:
T. Yoshida et al., "Hierarchical Distribution Matching for Probabilistically Shaped Coded Modulation" Journal of Lightwave Technology, vol. 37, no. 6, pp. 1579-1589, March 2019.

Hereinafter, an example of the probability distribution shaping encoding of the transmission modulation symbol by the probability distribution shaping-encoding unit 21 will be described.

For example, the probability distribution shaping-encoding unit 21 divides the subchannels $SC_1$ to $SC_{M \times N}$ into a plurality of groups, and calculates an average value of SNRs of each of the groups or a median value of SNRs of each of the groups.

The probability distribution shaping-encoding unit 21 gives a larger entropy to each of the groups as the average value of the SNRs of each of the groups or the median value of the SNRs of each of the groups is larger as the entropies in each of the subchannels $SC_1$ to $SC_{M \times N}$. The method for determining the entropy in accordance with the average value of the SNRs of each of the groups or the median value of the SNRs of each of the groups may be any method. For example, the method for determining the entropy depending on the SNR of the subchannel disclosed in Non-Patent Literature 1 can be used.

Entropies corresponding to N representative SNRs obtained by dividing M×N subchannels $SC_1$ to $SC_{M \times N}$ into N groups are set as $H_1$ to $H_N$.

When a value obtained by weighting and averaging the entropies $H_1$ to $H_N$ by the symbol rate of each group is, for example, 4.25 bits/complex symbol, the information bit string BS can include information represented by up to 4.25 bits/complex symbol. A case where the symbol mapping units 24-$n$-1 to 24-$n$-M in the subsequent stage use eight types of transmission modulation symbols −7, −5, −3, −1, 1, 3, 5, and 7 is assumed. Modulation in the assumed case is 8-level Pulse Amplitude Modulation (PAM), denoted as 8 PAM. The number of bits that can be communicated by the eight types of real symbols is 3 bits, and the information rate is 3 bits/real symbol. This is achieved when the appearance probabilities of the eight types of symbols are equal. In a case where eight types of real symbols appear with equal probability, the binary entropy of the real symbol is three, and the binary entropy is equal to three (bits/real symbol) of the information rate. On the other hand, in a case where the appearance probability of the real symbol is non-uniform, the binary entropy of the real symbol is smaller than three.

For example, a case is assumed in which "1" or "−1" appears the most frequently, next "3" or "−3" appears the most frequently, next "5" or "−5" appears the most frequently, and "7" or "−7" appears the least frequently. The square of the absolute value of a symbol amplitude value is energy, the energy of "1" or "−1" is 1, the energy of "3" or "−3" is 9, the energy of "5" or "−5" is 25, and the energy of "7" or "−7" is 49.

As described above, the probability distribution shaping-encoding unit 21 shapes the probability distributions $PD_1$ to $PD_N$ of the transmission modulation symbols, and thereby the average energy E corresponding to the plurality of information bit strings BS input continuously or discontinuously decreases with the lapse of time. Here, the shaping of the probability distributions $PD_1$ to $PD_N$ is not an equal probability distribution but a biased probability distribution.

The quality of probability distribution shaping can be quantified by a constellation gain $G=(2^{\wedge}(SE)-1)d_{min}^{\wedge}2/(6E)$. SE is frequency utilization efficiency (bits/symbol) in a two-dimensional plane. The two-dimensional plane is a complex plane. In 64QAM in which 8PAM is independently used for each of an in-phase component and a quadrature component of quadrature amplitude modulation (QAM), 6 bits/complex symbol is a maximum value. $d_{min}$ is the minimum Euclidean distance, in this example $d_{min}=2$. The minimum Euclidean distance is a minimum distance between signal points.

G=0 dB is obtained in normal 4QAM, 16QAM, 64QAM, 256QAM, and the like in which the probability distribution shaping encoding is not performed, and the constellation gain G is 1.53 dB at the maximum in QAM to which the probability distribution shaping encoding is applied. The optical fiber communication path can be approximately regarded as a Gaussian channel, but it is known that an achievable information rate in the Gaussian channel is $AIR=\log_2(1+SNR)$ as a Shannon limit. The Gaussian channel means an additive Gaussian noise communication path. If probability distribution shaping can be applied to increase the constellation gain G, then the SNR to AIR relationship can be brought closer to the Shannon limit. That is, the information rate at a certain SNR can be increased, or the SNR necessary for obtaining a certain information rate can be decreased.

An example of the probability distribution $PD_n$ (n=1, N) of the shaped transmission modulation symbols −7, −5, −3, −1, 1, 3, 5, and 7 is as follows. Example of N=2.

An example of N=2 is as follows.

| Transmission modulation symbol | | Probability distribution $PD_1$ |
|---|---|---|
| "1" | → | 0.4 |
| "3" | → | 0.1 |
| "−1" | → | 0.4 |
| "−3" | → | 0.1 |

| Transmission modulation symbol | | Probability distribution $PD_2$ |
|---|---|---|
| "1" | → | 0.2 |
| "3" | → | 0.15 |
| "5" | → | 0.1 |
| "7" | → | 0.05 |
| "−1" | → | 0.2 |
| "−3" | → | 0.15 |
| "−5" | → | 0.1 |
| "−7" | → | 0.05 |

After determining the probability distribution $PD_n$ (n=1, 2, . . . , N) of the transmission modulation symbol, the probability distribution shaping-encoding unit 21 converts the externally provided information bit string BS into N shaped bit strings $SBS_1$ to $SBS_N$ corresponding to the determined transmission modulation symbol probability distribution (step ST2 in FIG. 7).

The probability distribution shaping-encoding unit 21 outputs the shaped bit strings $SBS_1$ to $SBS_N$ to the error correction encoding unit 23.

For example, in a case of N=2, if the information bit string BS is, for example, "1001", the probability distribution shaping-encoding unit 21 converts the information bit string BS to generate "01" as the shaped bit string $SBS_1$ and generate "0011" as the shaped bit string $SBS_2$.

Here, in the "01" in the shaped bit string $SBS_1$, each symbol in the gray-encoded positive real number binary modulation symbol is "(1,3)", and in the "0011" in the shaped bit string $SBS_2$, each symbol in the positive real number 4-ary modulation symbol is "(1,5)".

In the subchannel encoding device 11 illustrated in FIG. 2, the probability distribution shaping-encoding unit 21 determines the probability distribution $PD_n$ (n=1, 2, . . . , N) of the transmission modulation symbols so that the average energy E corresponding to the information bit string BS decreases. It is sufficient that the probability distribution shaping-encoding unit 21 can increase the total information rate of the M×N subchannels $SC_1$ to $SC_{M\times N}$ by determining the probability distribution $PD_n$ of the transmission modulation symbols. In the case of a Gaussian channel not including approximation, it is optimal to shape the probability distribution PD of the transmission modulation symbols into a discrete Gaussian distribution called Maxwell-Boltzmann distribution so that the average energy E of the information bit string BS decreases as much as possible. However, in consideration of application and implementation to an optical fiber communication path, it is not necessarily optimal, and it is not limited thereto. For example, when the information bit string BS is associated with the transmission modulation symbols of the complex number, the probability distribution shaping-encoding unit 21 may determine the probability distribution PD of the transmission modulation symbols so that the time average of high-order moments such as kurtosis for the signal of the complex number becomes small.

The error correction encoding unit 23 acquires the shaped bit strings $SBS_1$ to $SBS_N$ output from the probability distribution shaping-encoding unit 21.

The error correction encoding unit 23 treats the shaped bit strings $SBS_1$ to $SBS_n$ collectively as an error correction code information bit string IFEC, and calculates a parity bit string PFEC which is an error correction code redundant bit string. Then, the error correction encoding unit 23 separates the calculated parity bit string PFEC into parity bits $pb_1$ to $pb_n$. Since the process of calculating the parity bit string PFEC from the error correction code redundant bit string is a known technique, detailed description thereof will be omitted.

The error correction encoding unit 23 adds the parity bits $pb_n$ to the shaped bit string $SBS_n$ to generate an error correction encoding bit string $ECS_n$ (n=1, 2, . . . , N) including the parity bits $pb_n$ (step ST3 in FIG. 7).

In the subchannel encoding device 11 illustrated in FIG. 2, the error correction encoding unit 23 calculates the parity bit string PFEC as the error correction redundant bit string. As the error correction code used to generate the parity bits in the error correction encoding unit 23, a low density parity check code, a Hamming code, a turbo product code using a BCH code, an RS code, a polar code, or the like can be used.

For example, a case where N=2, the shaped bit strings $SBS_1$="01" and $SBS_2$="0011", the separated parity bits $pb_1$="01" and $pb_2$="10", and the error correction encoding bit strings $ECS_{1-1}$="00", $ECS_{1-2}$="11", $ECS_{2-1}$="100", and $ECS_{2-2}$="111" are satisfied is considered as an example. Here, "00" in the error correction encoding bit string $ECS_{1-1}$ is "1" of the gray-encoded real number 4-ary modulation symbol, "11" in the error correction encoding bit string $ECS_{1-2}$ is "−3" of the gray-encoded real number 4-ary modulation symbol, "100" in the error correction encoding bit string $ECS_{2-1}$ is "−1" of the gray-encoded real number 8-ary modulation symbol, and "011" in the error correction encoding bit string $ECS_{2-2}$ is "5" of the gray-encoded real number 8-ary modulation symbol. In this example, the parity bit $pb_1$ and the parity bit $pb_2$ are used as sign bits representing positive/negative. Parity bits are generally allocated to sign bits that do not affect energy because it is difficult to shape their probability distribution and the occurrence probability of "0" and "1" is generally uniform.

After generating N error correction encoding bit strings $ECS_1$ to $ECS_N$, the error correction encoding unit 23 separates each of the error correction encoding bit strings $ECS_1$ to $ECS_N$ into M error correction encoding bit strings $ECS_{1-1}$ to $ECS_{1-M}$, $ECS_{2-1}$ to $ECS_{2-M}$, . . . , and $ECS_{N-1}$ to $ECS_{N-M}$ (step ST4 in FIG. 7).

The error correction encoding unit 23 outputs the separated M×N error correction encoding bit strings $ECS_{1-1}$ to $ECS_{N-M}$ to the symbol mapping units 24-1-1 to 24-N-M, respectively.

Upon receiving the error correction encoding bit string $ECS_{n-m}$ from the error correction encoding unit 23, the symbol mapping unit 24-$n$-$m$ (n=1, . . . , N; m=1, . . . , M) converts the error correction encoding bit string $ECS_{n-m}$ into a transmission modulation symbol $MS_{n-m}$ by performing bit-symbol conversion on the error correction encoding bit string $ECS_{n-m}$ (step ST5 in FIG. 7).

For example, pulse position modulation (PPM), binary phase shift keying (BPSK), quadrature phase shift keying (QPSK), quadrature amplitude modulation, amplitude phase modulation, set division, or multi-dimensional modulation can be used as the bit-symbol conversion of the error correction encoding bit string $ECS_{n-m}$.

The quadrature amplitude modulation includes, for example, 8 quadrature amplitude modulation (8QAM), 16QAM, 32QAM, 64QAM, 256QAM, 512QAM, and 1024QAM.

For example, a case where M=2 and N=2, and error correction encoding bit strings $CS_{1-1}$="00", $ECS_{1-1}$="11", $ECS_{2-1}$="100", and $ECS_{2-2}$="111" are satisfied is considered as an example.

The symbol mapping unit 24-1-$m$ generates a transmission modulation symbol $MS_{1-m}$ from the error correction encoding bit string $ECS_{1-m}$, for example, as described below.

| Error correction encoding bit string $ECS_{1-m}$ | | Transmission modulation symbol $MS_{1-m}$ |
|---|---|---|
| "00" | → | "1" |
| "01" | → | "3" |
| "10" | → | "−1" |
| "11" | → | "−3" |

Further, the symbol mapping unit 24-2-$m$ generates a transmission modulation symbol $MS_{2-m}$ from the error correction encoding bit string $ECS_{2-m}$, for example, as described below.

| Error correction encoding bit string $ECS_{2-m}$ | | Transmission modulation symbol $MS_{2-m}$ |
|---|---|---|
| "000" | → | "1" |
| "001" | → | "3" |

-continued

| Error correction encoding bit string $ECS_{2-m}$ | | Transmission modulation symbol $MS_{2-m}$ |
|---|---|---|
| "010" | → | "5" |
| "011" | → | "7" |
| "100" | → | "−1" |
| "101" | → | "−3" |
| "110" | → | "−5" |
| "111" | → | "−7" |

In this case, the transmission modulation symbol $MS_{1-1}$ is a gray-encoded real number 4-ary modulation symbol "1", the transmission modulation symbol $MS_{1-2}$ is a gray-encoded real number 4-ary modulation symbol "−3", the transmission modulation symbol $MS_{2-1}$ is a gray-encoded real number 8-ary modulation symbol "−1", and the transmission modulation symbol $MS_{2-2}$ is a gray-encoded real number 8-ary modulation symbol "5".

The symbol mapping unit 24-$n$-$m$ outputs the generated transmission modulation symbol $MS_{n-m}$ to the signal generation processing unit 25-$n$-$m$.

Upon receiving the transmission modulation symbol $MS_{n-m}$ from the symbol mapping unit 24-$n$-$m$, the signal generation processing unit 25-$n$-$m$ generates a subchannel signal $SCS_{n-m}$ from the transmission modulation symbol $MS_{n-m}$ (step ST6 in FIG. 7).

The subchannel signal $SCS_{n-m}$ is a signal that treats, for example, two adjacent real symbols among a plurality of symbols included in the transmission modulation symbol $MS_{n-m}$ as complex symbols. The complex symbol is a two-dimensional symbol.

When the plurality of real symbols included in the transmission modulation symbol $MS_{n-m}$ are, for example, "−1, 5, 1, −3, . . . , −1, 1, 3, 3, −5, −3", the signal generation processing unit 25-$n$-$m$ generates "(−1, 5), (1, −3), . . . , (−1, 1), (3, 3), (−5, −3)" as the subchannel signal $SCS_{n-m}$. The subchannel signal $SCS_{n-m}$ corresponds to each symbol included in the transmission modulation symbol $MS_{n-m}$ to which a narrowband root-raised cosine low-pass filter (RRC-LPF: Root Raised Cosine Low Pass Filter) is applied.

The signal generation processing unit 25-$n$-$m$ outputs the generated subchannel signal $SCS_{n-m}$ to the signal multiplexing unit 26.

Upon receiving the M×N subchannel signals $SCS_{1-1}$ to $SCS_{N-M}$ from the signal generation processing units 25-1-1 to 25-N-M, the signal multiplexing unit 26 multiplexes the M×N subchannel signals $SCS_{1-1}$ to $SCS_{N-M}$ to generate the subchannel multiplexed signal $E_{scmux}$ (step ST7 in FIG. 7).

The signal multiplexing unit 26 outputs the generated subchannel multiplexed signal $E_{scmux}$ to the conversion amplifier 12.

Hereinafter, generation processing of the subchannel multiplexed signal $E_{scmux}$ by the signal multiplexing unit 26 will be specifically described.

The signal multiplexing unit 26 superimposes the M×N subchannel signals $SCS_{1-1}$ to $SCS_{N-M}$ on an orthogonal basis, and multiplexes, for example, the M×N subchannel signals $SCS_{1-1}$ to $SCS_{N-M}$ on a frequency axis.

For example, symbol rates that are symbol rates of the M×N subchannel signals $SCS_{1-1}$ to $SCS_{N-M}$ are $B_s$=8 [Gsymbol/s], the roll-off rate of RRC is α=0.01, and M×N=$n_{sc}$=8.

In addition, when the interval between the center frequencies $f_1$ to $f_8$ in the subchannels $SC_1$ to $SC_8$ is $df_{sc}$=$B_s$(1+α)=0.08 [GHz], and the indexes for identifying the subcarriers $SC_1$ to $SC_8$ are j=1, 2, ..., and 8, the center frequency $f_j$ of the subchannel $SC_j$ is expressed by the following equation (1).

$$f_j = df_{sc}\left(j - \frac{n_{sc}}{2}\right) - \frac{df_{sc}}{2} \tag{1}$$

The subchannel multiplexed signal $E_{scmux}$ is expressed by the following equation (2).

$$E_{scmux}[i] = \sum_{j=1}^{n_{sc}} scs_j[i]\exp(2\pi f_j[i]) \tag{2}$$

In equation (2), i is an index on the time axis.

The conversion amplifier 12 acquires the subchannel multiplexed signal $E_{scmux}$ output from the signal multiplexing unit 26 of the subchannel encoding device 11.

The conversion amplifier 12 converts the acquired subchannel multiplexed signal $E_{scmux}$ from a digital signal to an analog signal and amplifies the analog signal.

The conversion amplifier 12 outputs the amplified analog signal to the optical modulator 14.

The transmission light source 13 oscillates unmodulated light having a center wavelength of 1550 nm, for example, and outputs the oscillated unmodulated light to the optical modulator 14.

The optical modulator 14 generates an optical signal by modulating the unmodulated light output from the transmission light source 13 in accordance with the amplified analog signal output from the conversion amplifier 12.

The optical modulator 14 outputs the generated optical signal to the optical transmission line 2.

The optical transmission line 2 transmits the optical signal output from the optical modulator 14 to the optical reception device 3.

The reception light source 15 of the optical reception device 3 oscillates unmodulated light having a center wavelength of 1550 nm, for example, and outputs the oscillated unmodulated light to the optical receiver 16.

The optical receiver 16 coherently detects the optical signal transmitted by the optical transmission line 2 using the unmodulated light output from the reception light source 15.

The optical receiver 16 outputs an electrical signal indicating a coherent detection result of the optical signal to the amplifier converter 17.

The amplifier converter 17 amplifies the electrical signal output from the optical receiver 16 and converts the amplified electrical signal from an analog signal to a digital signal.

The amplifier converter 17 outputs the digital signal as the subchannel multiplexed signal $E_{scmux}$ to the subchannel decoding device 18.

Figure 8:
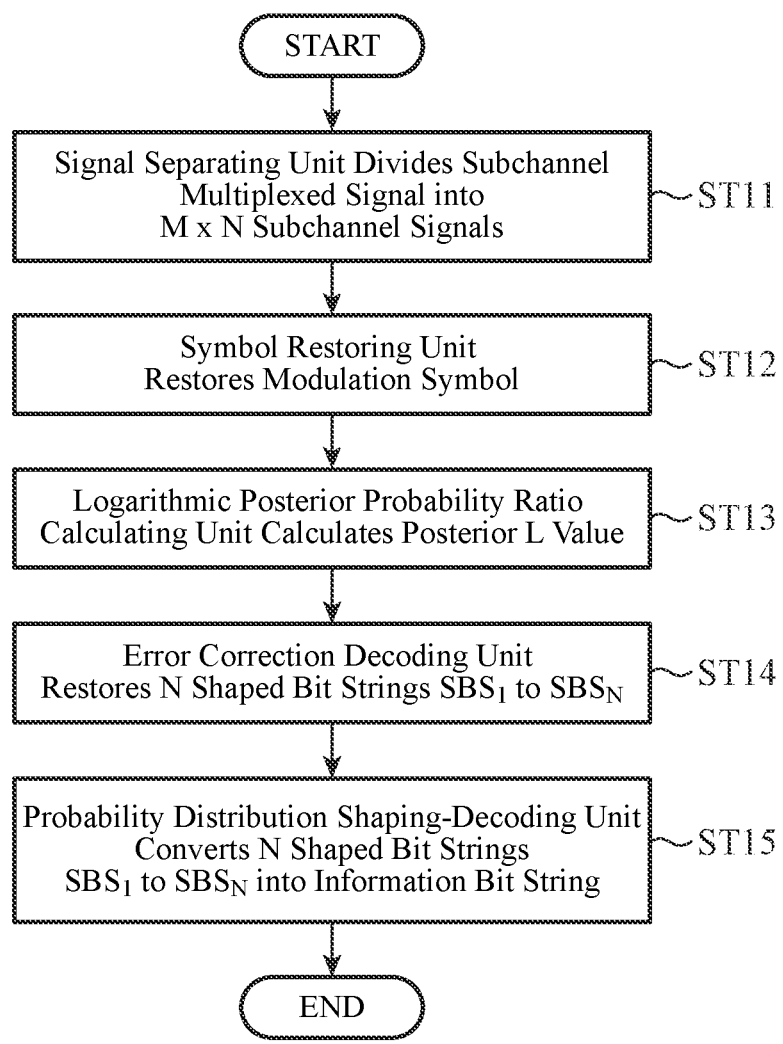
FIG. 8 is a flowchart illustrating a subchannel decoding method which is a processing procedure performed by the subchannel decoding device 18 according to the first embodiment.

FIG. 8 is a flowchart illustrating a subchannel decoding method which is a processing procedure performed by the subchannel decoding device 18 according to the first embodiment.

Hereinafter, the operation of the subchannel decoding device 18 illustrated in FIG. 4 will be described with reference to FIG. 8.

The signal separating unit 41 receives the subchannel multiplexed signal $E_{scmux}$ output from the amplifier converter 17.

The signal separating unit 41 separates the received subchannel multiplexed signal $E_{scmux}$ into M×N subchannel signals $SCS_{1-1}$ to $SCS_{N-M}$ (step ST11 in FIG. 8).

The separation processing of the subchannel multiplexed signal $E_{scmux}$ by the signal separating unit 41 is inverse processing of the multiplexing processing of the subchannel signals $SCS_{1-1}$ to $SCS_{N-M}$ by the signal multiplexing unit 26.

The signal separating unit 41 outputs the separated subchannel signals $SCS_{1-1}$ to $SCS_{N-M}$ to the symbol restoring units 43-1-1 to 43-N-M, respectively.

Upon receiving the subchannel signal $SCS_{n-m}$ from the signal separating unit 41, the symbol restoring unit 43-n-m restores the modulation symbol $MS_{n-m}$ from the subchannel signal $SCS_{n-m}$ (step ST12 in FIG. 8).

The restoration processing of the modulation symbol $MS_{n-m}$ by the symbol restoring unit 43-n-m is implemented by reception side digital signal processing known in coherent optical communication, such as waveform equalization or carrier wave restoration.

The symbol restoring unit 43-n-m outputs the restored modulation symbol $MS_{n-m}$ to the logarithmic posterior probability ratio calculating unit 44-n-m.

Upon receiving the restored modulation symbol $MS_{n-m}$ from the symbol restoring unit 43-n-m, the logarithmic posterior probability ratio calculating unit 44-n-m calculates $LRP_{n-m}$ that is a posterior L value from the restored modulation symbol $MS_{n-m}$ (step ST13 in FIG. 8).

The process of calculating $LRP_{n-m}$ from the restored modulation symbol $MS_{n-m}$ is disclosed in Non-Patent Literature 3 below, for example, and is a known technique, and thus detailed description thereof will be omitted.

Non-Patent Literature 3:

G. Bocherer et al., "Bandwidth Efficient and Rate-Matched Low-Density Parity-Check Coded Modulation" IEEE Transactions on Communications, vol. 63, no. 12, pp. 4651-4665, December 2015.

The logarithmic posterior probability ratio calculating unit 44-n-m outputs the calculated $LRP_{n-m}$ to the error correction decoding unit 45.

The $LRP_{n-m}$ is a value in which a ratio between a probability that a bit included in error correction encoding bit string $ECS_{n-m}$ generated by the error correction encoding unit 23 is zero and a probability that the bit is one on the basis of the restored modulation symbol $MS_{n-m}$ is represented by a natural logarithm.

The $LRP_{n-m}$ is represented by the sum of the prior L value and the external L value. The prior L value is a logarithmic ratio of a priori probabilities.

The a priori L value is a value in which a ratio between a probability that a bit included in the error correction encoding bit string $ECS_{n-m}$ is zero and a probability that the bit is one on the basis of the probability distribution of the transmission modulation symbol $MS_{n-m}$ generated by the symbol mapping unit 24-n-m and the symbol mapping rule is represented by a natural logarithm.

The external L value is a logarithmic likelihood ratio. The external L value is a value in which the ratio between the probability that the bit included in the error correction encoding bit string $ECS_{n-m}$ is zero and the probability that the bit is one in a state in which the deviation of the occurrence probability of the transmission modulation symbol $MS_{n-m}$ is compensated is represented by a natural logarithm.

Upon receiving LRP to $LRP_{N-M}$ from the logarithmic posterior probability ratio calculating units 44-1-1 to 44-N-M, the error correction decoding unit 45 restores the N information bit strings $SBS_1$ to $SBS_N$ by correcting the respective errors of $LRP_{1-1}$ to $LRP_{N-M}$ (step ST14 in FIG. 8).

The process of restoring the information bit strings $SBS_1$ to $SBS_N$ from the $LRP_{1-1}$ to the $LRP_{N-M}$ is a known technique, and thus detailed description thereof will be omitted.

The error correction decoding unit 45 outputs the restored N information bit strings $SBS_1$ to $SBS_N$ to the probability distribution shaping-decoding unit 46.

The probability distribution shaping-decoding unit 46 receives N shaped bit strings $SBS_1$ to $SBS_N$ from the error correction decoding unit 45.

The probability distribution shaping-decoding unit 46 performs decoding paired with the encoding in the probability distribution shaping-encoding unit 21 illustrated in FIG. 2 and resolves the shaping (step ST15 in FIG. 8).

The probability distribution shaping-decoding unit 46 converts the restored shaped bit strings $SBS_1$ to $SBS_N$ into the restored information bit string BS (step ST16 in FIG. 8).

The probability distribution shaping-decoding unit 46 outputs the restored information bit string BS to the outside of the device.

In the first embodiment described above, the subchannel encoding device 11 is configured to include the probability distribution shaping-encoding unit 21 for dividing the M×N subchannels into N groups, shaping the probability distribution of the transmission modulation symbols of each group on the basis of the SNRs of the M×N subchannels, and converting the information bit string into the shaped bit string corresponding to the probability distribution of the transmission modulation symbols of each group, the subchannel signal generating unit 22 for generating each subchannel signal in the M×N subchannels from the shaped bit string, and the signal multiplexing unit 26 for multiplexing the M×N subchannel signals generated by the subchannel signal generating unit 22 to generate the subchannel multiplexed signal. Therefore, the subchannel encoding device 11 can increase the information rate in the total of the plurality of subchannels without implementing the probability distribution shaping-encoding units as many as the M×N subchannels.

Furthermore, in the first embodiment, the subchannel decoding device 18 is configured to include the signal separating unit 41 for separating the subchannel multiplexed signal into M×N subchannel signals, the shaped bit string restoring unit 42 for restoring N groups of shaped bit strings from the M×N subchannel signals separated by the signal separating unit 41, and the probability distribution shaping-decoding unit 46 for converting the N groups of shaped bit strings restored by the shaped bit string restoring unit 42 into the information bit string. Therefore, the subchannel decoding device 18 can increase the information rate in the total of the plurality of subchannels without implementing the probability distribution shaping-decoding units as many as the M×N subchannels.

In the subchannel encoding device 11 illustrated in FIG. 2, the probability distribution shaping-encoding unit 21 determines the probability distributions $PD_1$ to $PD_N$ of the transmission modulation symbols on the basis of the SNRs of the M×N subchannels $SC_1$ to $SC_{M \times N}$, and converts the information bit string BS into a shaped bit string $SBS_n$ corresponding to the probability distribution $PD_n$ of the transmission modulation symbols.

The probability distribution shaping-encoding unit 21 may include, for example, a table indicating a correspondence relationship between the information bit string BS and the shaped bit string. If the probability distribution shaping-encoding unit 21 includes the table, the shaped bit strings $SBS_1$ to $SBS_N$ corresponding to the input information bit string BS are acquired from among the plurality of shaped bit strings included in the table, and the acquired shaped bit strings $SBS_1$ to $SBS_N$ are output to the error correction encoding unit 23.

This table can be composed of a single lookup table if the address space of the table is small. Even in a case where the address space of the table is large, and the table cannot be configured by a single lookup table, it is possible to configure the table using a plurality of hierarchized small lookup table groups as in Non-Patent Literature 2.

In the subchannel decoding device 18 illustrated in FIG. 4, the probability distribution shaping-decoding unit 46 restores the information bit string from the restored shaped bit string.

The probability distribution shaping-decoding unit 46 may include, for example, a table indicating a correspondence relationship between the restored shaped bit string and the restored information bit string BS. When the probability distribution shaping-decoding unit 46 includes the table, the restored information bit string BS corresponding to the restored shaped bit strings $SBS_1$ to $SBS_N$ is acquired from among the plurality of restored information bit string BS included in the table, and the acquired restored information bit string BS is output to the outside of the device.

This table can be composed of a single lookup table if the address space of the table is small. Even in a case where the address space of the table is large, and the table cannot be configured by a single lookup table, it is possible to configure the table using a plurality of hierarchized small lookup table groups as in Non-Patent Literature 2.

Second Embodiment

In a second embodiment, a subchannel encoding device 11 in which the probability distribution shaping-encoding unit 21 includes N probability distribution shaping-encoding processing units 72-1 to 72-N will be described.

In addition, in the second embodiment, a subchannel decoding device 18 in which the probability distribution shaping-decoding unit 46 includes N probability distribution shaping-decoding processing units 91-1 to 91-N will be described.

Figure 9:
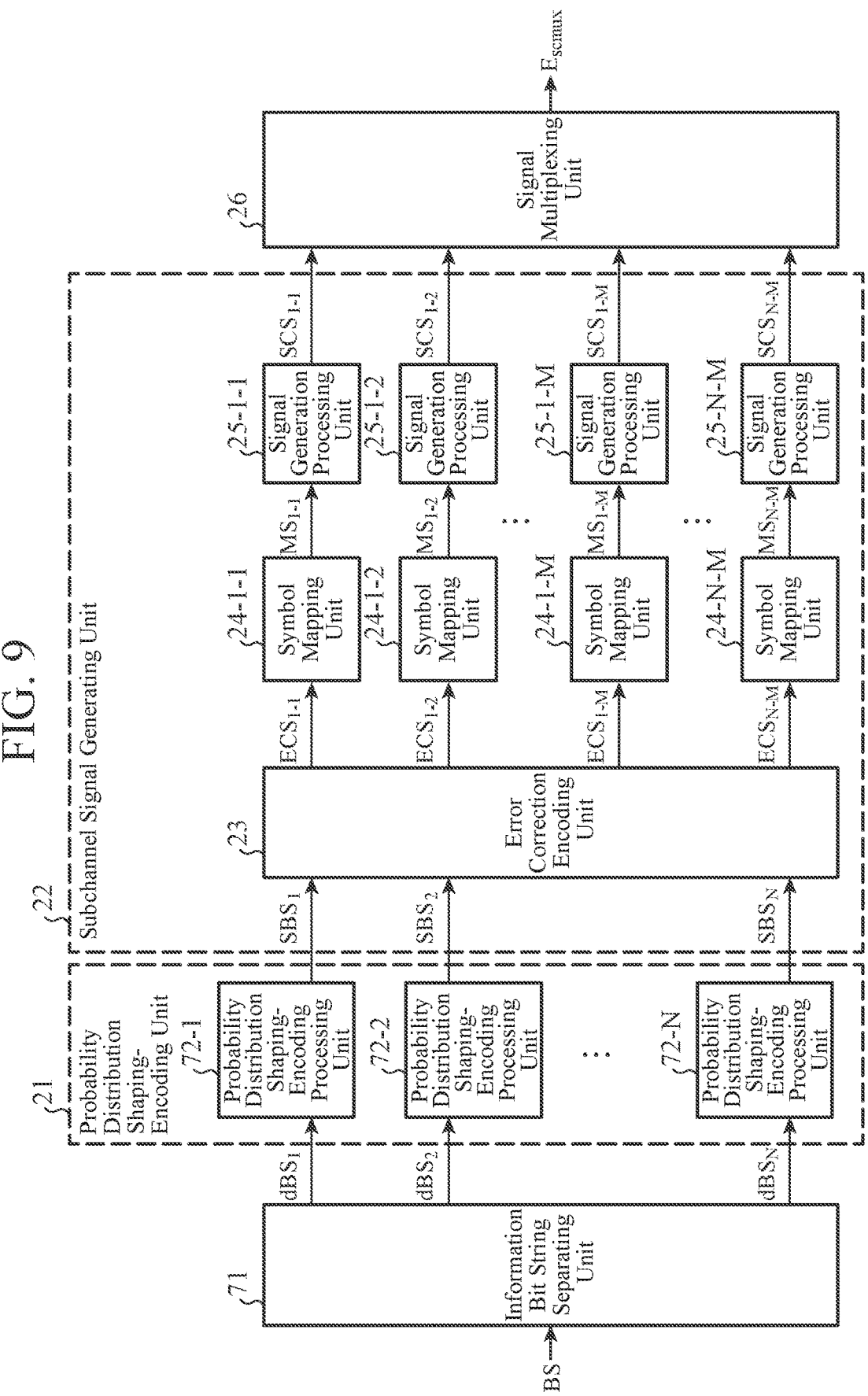
FIG. 9 is a configuration diagram illustrating a subchannel encoding device 11 according to a second embodiment.

FIG. 9 is a configuration diagram illustrating a subchannel encoding device 11 according to a second embodiment.

Figure 10:
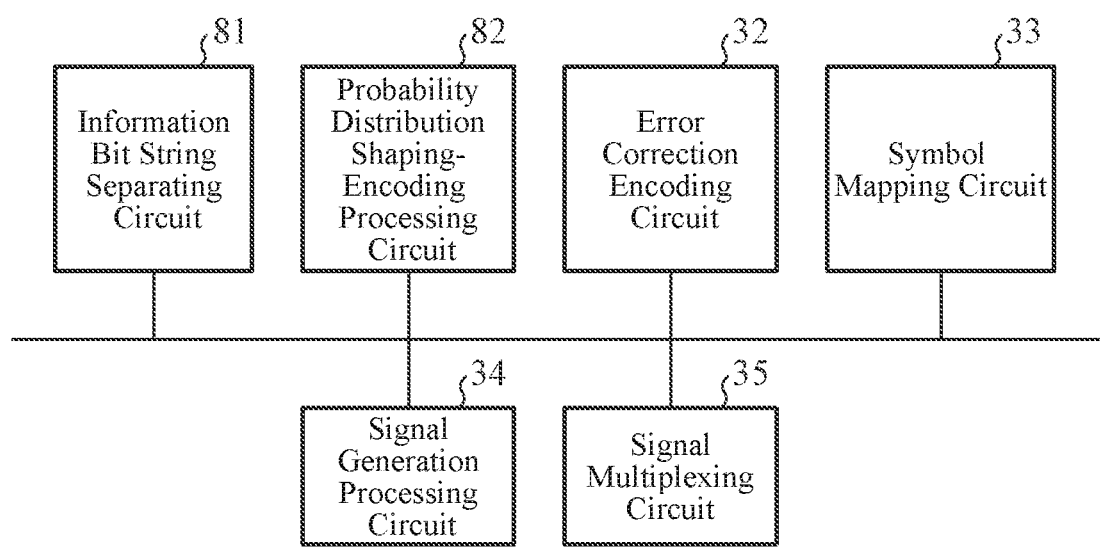
FIG. 10 is a hardware configuration diagram illustrating hardware of the subchannel encoding device 11 according to the second embodiment.

FIG. 10 is a hardware configuration diagram illustrating hardware of the subchannel encoding device 11 according to the second embodiment.

In FIGS. 9 and 10, the same reference numerals as those in FIGS. 2 and 3 denote the same or corresponding parts, and thus detailed description thereof will be omitted.

The information bit string separating unit 71 is implemented by, for example, an information bit string separating circuit 81 illustrated in FIG. 10.

The information bit string separating unit 71 separates one information bit string BS into N information bit strings $dBS_1$ to $dBS_N$, and outputs the separated information bit strings $dBS_1$ to $dBS_N$ to probability distribution shaping-encoding processing units 72-1 to 72-N, respectively.

The M×N subchannels $SC_1$ to $SC_{M \times N}$ are classified into N groups.

For example, the subchannels $SC_1$ to $SC_N$ are classified into a group (1), subchannels $SC_{N+1}$ to $SC_{2N}$ are classified into a group (2), and $SC_{2N+1}$ to $SC_{3N}$ are classified into a group (3).

In addition, $SC_{M\times(N-1)+1}$ to $SC_{M\times N}$ are classified into a group (N).

Each of the probability distribution shaping-encoding processing units 72-1 to 72-N is implemented by, for example, a probability distribution shaping-encoding processing circuit 82 illustrated in FIG. 10.

The probability distribution shaping-encoding processing unit 72-$n$ (n=1, ..., N) determines the probability distribution of the transmission modulation symbols on the basis of SNRs of subchannels $SC_{m\times(n-1)+1}$ to $SC_{m\times n}$ belonging to the group (n). Hereinafter, a probability distribution obtained by sample-averaging the probability distributions of the transmission modulation symbols generated by the symbol mapping units 24-1-1 to 24-N-M at the subsequent stage on the basis of the shaped bit string is referred to as $PD_n$.

The probability distribution shaping-encoding processing unit 72-$n$ converts the information bit string $dBS_n$ output from the information bit string separating unit 71 into a shaped bit string $SBS_n$.

The probability distribution shaping-encoding processing unit 72-$n$ outputs the shaped bit string $SBS_n$ to the error correction encoding unit 23.

Figure 11:
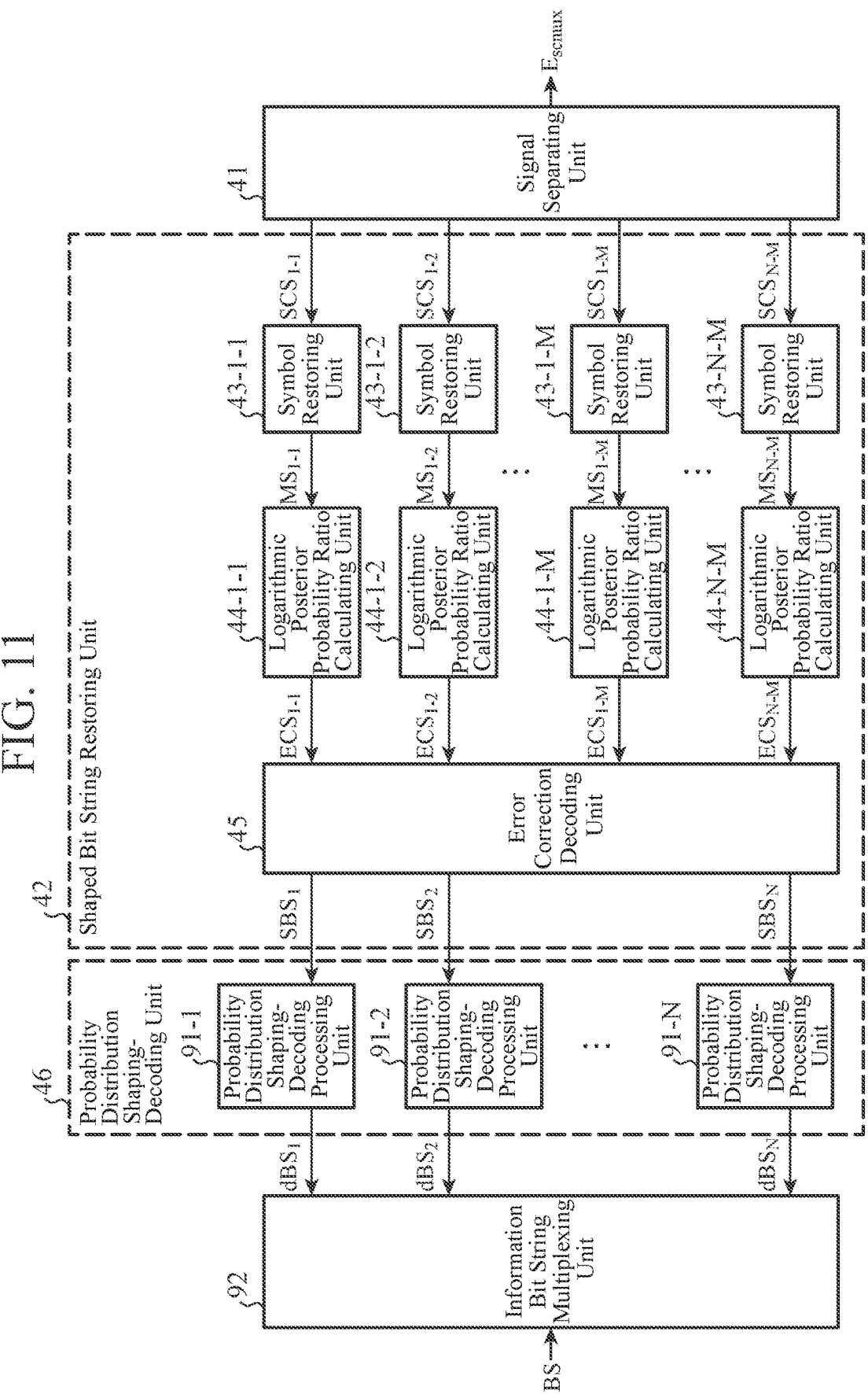
FIG. 11 is a configuration diagram illustrating a subchannel decoding device 18 according to the second embodiment.

FIG. 11 is a configuration diagram illustrating the subchannel decoding device 18 according to the second embodiment.

FIG. 12 is a hardware configuration diagram illustrating hardware of the subchannel decoding device 18 according to the second embodiment.

In FIGS. 11 and 12, the same reference numerals as those in FIGS. 4 and 5 denote the same or corresponding parts, and thus detailed description thereof will be omitted.

Similarly to the first embodiment, the error correction decoding unit 45 restores the shaped bit strings $SBS_1$ to $SBS_N$ from $LRP_{1-1}$ to $LRP_{N-M}$ calculated by the logarithmic posterior probability ratio calculating units 44-1-1 to 44-N-M.

The error correction decoding unit 45 outputs the restored shaped bit strings $SBS_1$ to $SBS_N$ to the probability distribution shaping-decoding processing units 91-1 to 91-N, respectively.

Each of the probability distribution shaping-decoding processing units 91-1 to 91-N is implemented by, for example, a probability distribution shaping-decoding processing circuit 101 illustrated in FIG. 12.

The probability distribution shaping-decoding processing unit 91-$n$ converts the shaped bit string $SBS_n$ output from the error correction decoding unit 45 into the information bit string $dBS_n$ belonging to the group (n) on the basis of SNRs of the subchannels $SC_{m\times(n-1)+1}$ to $SC_{m\times n}$ belonging to the group (n).

Note that the conversion into the information bit string $dBS_n$ by the probability distribution shaping-decoding processing unit 91-$n$ means that the shaping of the shaped bit string $SBS_n$ is terminated and the information bit string $dBS_n$ is restored.

An information bit string multiplexing unit 92 is implemented by, for example, an information bit string multiplexing circuit 102 illustrated in FIG. 12.

The information bit string multiplexing unit 92 restores one information bit string BS by multiplexing the N information bit strings $dBS_1$ to $dBS_N$ restored by the probability distribution shaping-decoding processing units 91-1 to 91-N.

In FIG. 9, it is assumed that each of the information bit string separating unit 71, the probability distribution shaping-encoding processing units 72-1 to 72-N, the error correction encoding unit 23, the symbol mapping units 24-1-1 to 24-N-M, the signal generation processing units 25-1-1 to 25-N-M, and the signal multiplexing unit 26, which are components of the subchannel encoding device 11, is implemented by dedicated hardware as illustrated in FIG. 10. That is, it is assumed that the subchannel encoding device 11 is implemented by the information bit string separating circuit 81, the probability distribution shaping-encoding processing circuit 82, the error correction encoding circuit 32, the symbol mapping circuit 33, the signal generation processing circuit 34, and the signal multiplexing circuit 35.

Here, each of the information bit string separating circuit 81, the probability distribution shaping-encoding processing circuit 82, the error correction encoding circuit 32, the symbol mapping circuit 33, the signal generation processing circuit 34, and the signal multiplexing circuit 35 corresponds to, for example, a single circuit, a composite circuit, a programmed processor, a parallel-programmed processor, ASIC, FPGA, or a combination thereof.

The components of the subchannel encoding device 11 are not limited to those implemented by dedicated hardware, but the subchannel encoding device 11 may be implemented by software, firmware, or a combination of software and firmware.

In a case where the subchannel encoding device 11 is implemented by software, firmware, or the like, a program for causing a computer to execute processing procedures performed by the information bit string separating unit 71, the probability distribution shaping-encoding processing units 72-1 to 72-N, the error correction encoding unit 23, the symbol mapping units 24-1-1 to 24-N-M, the signal generation processing units 25-1-1 to 25-N-M, and the signal multiplexing unit 26 is stored in the memory 61 illustrated in FIG. 6. Then, the processor 62 illustrated in FIG. 6 executes the program stored in the memory 61.

In FIG. 11, it is assumed that each of the signal separating unit 41, the symbol restoring units 43-1-1 to 43-N-M, the logarithmic posterior probability ratio calculating units 44-1-1 to 44-N-M, the error correction decoding unit 45, the probability distribution shaping-decoding processing units 91-1 to 91-N, and the information bit string multiplexing unit 92, which are components of the subchannel decoding device 18, is implemented by dedicated hardware as illustrated in FIG. 12. That is, it is assumed that the subchannel decoding device 18 is implemented by the signal separating circuit 51, the symbol restoring circuit 52, the logarithmic posterior probability ratio calculating circuit 53, the error correction decoding circuit 54, the probability distribution shaping-decoding processing circuit 101, and the information bit string multiplexing circuit 102.

Here, each of the signal separating circuit 51, the symbol restoring circuit 52, the logarithmic posterior probability ratio calculating circuit 53, the error correction decoding circuit 54, the probability distribution shaping-decoding processing circuit 101, and the information bit string multiplexing circuit 102 corresponds to, for example, a single circuit, a composite circuit, a programmed processor, a parallel-programmed processor, ASIC, FPGA, or a combination thereof.

The components of the subchannel decoding device 18 are not limited to those implemented by dedicated hardware, but the subchannel decoding device 18 may be implemented by software, firmware, or a combination of software and firmware.

In a case where the subchannel decoding device 18 is implemented by software, firmware, or the like, a program for causing a computer to execute processing procedures performed by the signal separating unit 41, the symbol restoring units 43-1-1 to 43-N-M, the logarithmic posterior probability ratio calculating units 44-1-1 to 44-N-M, the error correction decoding unit 45, the probability distribution shaping-decoding processing units 91-1 to 91-N, and the information bit string multiplexing unit 92 is stored in the memory 61 illustrated in FIG. 6. Then, the processor 62 illustrated in FIG. 6 executes the program stored in the memory 61.

Considering the case of multistage transmission of the optical cross-connect device, among the SNRs of the M×N subchannels, for example, the SNR of the subchannel having the k-th highest center frequency counted from the subchannel having the lowest center frequency and the SNR of the subchannel having the k-th lowest center frequency counted from the subchannel having the highest center frequency are substantially the same due to the optical filter characteristic.

For example, it is assumed that M×N=8, the center frequencies $f_1$ to $f_8$ in the subchannels $SC_1$ to $SC_8$ are at equal intervals, and $f_1 < f_2 < \ldots f_7 < f_8$.

In this case, the subchannel $SC_1$ and the subchannel $SC_8$ have approximately the same SNR, and the subchannel $SC_2$ and the subchannel $SC_7$ have approximately the same SNR. In addition, the subchannel $SC_3$ and the subchannel $SC_6$ have approximately the same SNR, and the subchannel $SC_4$ and the subchannel $SC_5$ have approximately the same SNR.

Therefore, if the entropy given to the subchannels $SC_1$ to $SC_8$ is determined as follows, it is possible to increase the information rate in the total of all the subchannels.

The entropy given to the subchannel $SC_1$ and the subchannel $SC_8$ is determined depending on the average value of the SNR of the subchannel $SC_1$ and the SNR of the subchannel $SC_8$.

The entropy given to the subchannel $SC_2$ and the subchannel $SC_7$ is determined depending on the average value of the SNR of the subchannel $SC_2$ and the SNR of the subchannel $SC_7$.

The entropy given to the subchannel $SC_3$ and the subchannel $SC_6$ is determined depending on the average value of the SNR of the subchannel $SC_3$ and the SNR of the subchannel $SC_6$.

The entropy given to the subchannel $SC_4$ and the subchannel $SC_5$ is determined depending on the average value of the SNR of the subchannel $SC_4$ and the SNR of the subchannel $SC_5$.

In a case where the entropy given to each of the subchannels $SC_1$ to $SC_8$ is determined as described above, the subchannel encoding device 11 does not need to implement the probability distribution shaping-encoding units as many as the subchannels $SC_1$ to $SC_8$, and it is sufficient that N(=4) probability distribution shaping-encoding processing units 72-1 to 72-N are implemented.

In addition, the subchannel decoding device 18 does not need to implement the probability distribution shaping-decoding units as many as the subchannels $SC_1$ to $SC_8$, and it is sufficient that N(=4) probability distribution shaping-decoding processing units 91-1 to 91-N are implemented.

Next, the operation of the subchannel encoding device 11 illustrated in FIG. 9 will be described. Note that, the operations of the information bit string separating unit 71 and the probability distribution shaping-encoding processing units 72-1 to 72-N will be mainly described here since the operations other than the information bit string separating unit 71 and the probability distribution shaping-encoding processing units 72-1 to 72-N are substantially the same as those of the subchannel encoding device 11 illustrated in FIG. 2.

The M×N subchannels $SC_1$ to $SC_{M \times N}$ are classified into N groups.

In the subchannel encoding device 11 illustrated in FIG. 9, for example, M=2, N=4, and M×N=8, and the subchannels $SC_1$ and $SC_8$ are classified into a group (1), and the subchannels $SC_2$ and $SC_7$ are classified into a group (2). Further, the subchannels $SC_3$ and $SC_6$ are classified into a group (3), and the subchannels $SC_4$ and $SC_5$ are classified into a group (4).

When one information bit string BS is given from the outside of the device, the information bit string separating unit 71 separates the one information bit string BS into four information bit strings $dBS_1$, $dBS_2$, $dBS_3$, and $dBS_4$.

The information bit string $dBS_1$ is an information bit string transmitted by the subchannels $SC_1$ and $SC_8$ belonging to the group (1), and the information bit string $dBS_2$ is an information bit string transmitted by the subchannels $SC_2$ and $SC_7$ belonging to the group (2).

The information bit string $dBS_3$ is an information bit string transmitted by the subchannels $SC_3$ and $SC_5$ belonging to the group (3), and the information bit string $dBS_4$ is an information bit string transmitted by the subchannels $SC_4$ and $SC_5$ belonging to the group (4).

The information bit string separating unit 71 outputs the information bit string $dBS_1$ to the probability distribution shaping-encoding processing unit 72-1, and outputs the information bit string $dBS_2$ to the probability distribution shaping-encoding processing unit 72-2. Further, the information bit string separating unit 71 outputs the information bit string $dBS_3$ to the probability distribution shaping-encoding processing unit 72-3, and outputs the information bit string $dBS_4$ to the probability distribution shaping-encoding processing unit 72-4.

The separation of the information bit string BS by the information bit string separating unit 71 may be performed so that, for example, the lengths of the four information bit strings $dBS_1$, $dBS_2$, $dBS_3$, and $dBS_4$ are separated depending on the entropy given to the subchannel belonging to the group (n).

The probability distribution shaping-encoding processing unit 72-1 shapes the probability distribution $PD_1$ of the transmission modulation symbols in the information bit string $dBS_1$ output from the information bit string separating unit 71 on the basis of SNR of the subchannel $SC_1$ belonging to the group (1) or the SNR of the subchannel $SC_8$ belonging to the group (1).

The probability distribution shaping-encoding processing unit 72-2 shapes the probability distribution $PD_2$ of the transmission modulation symbols in the information bit string $dBS_2$ output from the information bit string separating unit 71 on the basis of SNR of the subchannel $SC_2$ belonging to the group (2) or the SNR of the subchannel $SC_7$ belonging to the group (2).

The probability distribution shaping-encoding processing unit 72-3 shapes the probability distribution $PD_3$ of the transmission modulation symbols in the information bit string $dBS_3$ output from the information bit string separating unit 71 on the basis of SNR of the subchannel $SC_3$ belonging to the group (3) or the SNR of the subchannel $SC_6$ belonging to the group (3).

The probability distribution shaping-encoding processing unit 72-4 shapes the probability distribution $PD_4$ of the transmission modulation symbols in the information bit string $dBS_4$ output from the information bit string separating unit 71 on the basis of SNR of the subchannel $SC_4$ belonging to the group (4) or the SNR of the subchannel $SC_5$ belonging to the group (4).

The probability distribution shaping-encoding processing unit 72-1 converts the information bit string $dBS_1$ output from the information bit string separating unit 71 into a shaped bit string $SBS_1$ corresponding to the probability distribution $PD_1$ of the transmission modulation symbols, and outputs the shaped bit string $SBS_1$ to the error correction encoding unit 23.

The probability distribution shaping-encoding processing unit 72-2 converts the information bit string $dBS_2$ output from the information bit string separating unit 71 into a shaped bit string $SBS_2$ corresponding to the probability distribution $PD_2$ of the transmission modulation symbols, and outputs the shaped bit string $SBS_2$ to the error correction encoding unit 23.

The probability distribution shaping-encoding processing unit 72-3 converts the information bit string $dBS_3$ output from the information bit string separating unit 71 into the shaped bit string $SBS_3$ corresponding to the probability distribution $PD_3$ of the transmission modulation symbols, and outputs the shaped bit string $SBS_3$ to the error correction encoding unit 23.

The probability distribution shaping-encoding processing unit 72-4 converts the information bit string $dBS_4$ output from the information bit string separating unit 71 into the shaped bit string $SBS_4$ corresponding to the probability distribution $PD_4$ of the transmission modulation symbols, and outputs the shaped bit string $SBS_4$ to the error correction encoding unit 23.

Similarly to the first embodiment, the error correction encoding unit 23 calculates parity bits $pb_n$ which are redundant bits for the shaped bit string $SBS_n$ (n=1, 2, 3, and 4).

The error correction encoding unit 23 adds the parity bits $pb_n$ to the information bit string $dBS_n$ to generate an error correction encoding bit string $ECS_n$ including the parity bits $pb_n$.

When generating four error correction encoding bit strings $ECS_1$ to $ECS_4$, the error correction encoding unit 23 separates the error correction encoding bit string $ECS_1$ into M=2 error correction encoding bit strings $ECS_{1-1}$ and $ECS_{1-2}$, and separates the error correction encoding bit string $ECS_2$ into M=2 error correction encoding bit strings $ECS_{2-1}$ and $ECS_{2-2}$.

Further, the error correction encoding unit 23 separates the error correction encoding bit string $ECS_3$ into M=2 error correction encoding bit strings $ECS_{3-1}$ and $ECS_{3-2}$, and separates the error correction encoding bit string $ECS_4$ into M=2 error correction encoding bit strings $ECS_{4-1}$ and $ECS_{4-2}$.

The error correction encoding unit 23 outputs the error correction encoding bit string $ECS_{1-1}$ to the symbol mapping unit 24-1-1, and outputs the error correction encoding bit string $ECS_{1-2}$ to the symbol mapping unit 24-1-2.

The error correction encoding unit 23 outputs the error correction encoding bit string $ECS_{2-1}$ to the symbol mapping unit 24-2-1, and outputs the error correction encoding bit string $ECS_{2-2}$ to the symbol mapping unit 24-2-2.

The error correction encoding unit 23 outputs the error correction encoding bit string $ECS_{3-1}$ to the symbol mapping unit 24-3-1, and outputs the error correction encoding bit string $ECS_{3-2}$ to the symbol mapping unit 24-3-2.

The error correction encoding unit 23 outputs the error correction encoding bit string $ECS_{4-1}$ to the symbol mapping unit 24-4-1, and outputs the error correction encoding bit string $ECS_{4-2}$ to the symbol mapping unit 24-4-2.

Next, the operation of the subchannel decoding device 18 illustrated in FIG. 11 will be described. Note that, the operations of the probability distribution shaping-decoding processing units 91-1 to 91-N and the information bit string multiplexing unit 92 will be mainly described here since the operations other than the probability distribution shaping-decoding processing units 91-1 to 91-N and the information bit string multiplexing unit 92 are substantially similar to those of the subchannel decoding device 18 illustrated in FIG. 4.

Similarly to the first embodiment, the error correction decoding unit 45 restores the information bit strings $dBS_1$ to $dBS_N$ from $LRP_{1-1}$ to $LRP_{N-M}$ calculated by the logarithmic posterior probability ratio calculating units 44-1-1 to 44-N-M.

The error correction decoding unit 45 outputs the restored shaped bit strings $SBS_1$ to $SBS_N$ to the probability distribution shaping-decoding processing units 91-1 to 91-N, respectively.

For example, if M=2 and N=4, the error correction decoding unit 45 restores the shaped bit string $SBS_1$ from $LRP_{1-1}$ and $LRP_{1-2}$, and outputs the restored shaped bit string $SBS_1$ to the probability distribution shaping-decoding processing unit 91-1.

The error correction decoding unit 45 restores the shaped bit string $SBS_2$ from $LRP_{2-1}$ and $LRP_{2-2}$, and outputs the restored shaped bit string $SBS_2$ to the probability distribution shaping-decoding processing unit 91-2.

The error correction decoding unit 45 restores the shaped bit string $SBS_3$ from $LRP_{3-1}$ and $LRP_{3-2}$, and outputs the restored shaped bit string $SBS_3$ to the probability distribution shaping-decoding processing unit 91-3.

The error correction decoding unit 45 restores the shaped bit string $SBS_4$ from the $LRP_{4-1}$ and the $LRP_{4-2}$, and outputs the restored shaped bit string $SBS_4$ to the probability distribution shaping-decoding processing unit 91-4.

The probability distribution shaping-decoding processing unit 91-1 converts the shaped bit string $SBS_1$ output from the error correction decoding unit 45 into an information bit string $dBS_1$ and outputs the information bit string $dBS_1$ to the information bit string multiplexing unit 92.

The probability distribution shaping-decoding processing unit 91-2 converts the shaped bit string $SBS_2$ output from the error correction decoding unit 45 into an information bit string $dBS_2$ and outputs the information bit string $dBS_2$ to the information bit string multiplexing unit 92.

The probability distribution shaping-decoding processing unit 91-3 converts the shaped bit string $SBS_3$ output from the error correction decoding unit 45 into the information bit string $dBS_3$ and outputs the information bit string $dBS_3$ to the information bit string multiplexing unit 92.

The probability distribution shaping-decoding processing unit 91-4 converts the shaped bit string $SBS_4$ output from the error correction decoding unit 45 into the information bit string $dBS_4$ and outputs the information bit string $dBS_4$ to the information bit string multiplexing unit 92.

The information bit string multiplexing unit 92 acquires the information bit string $dBS_1$ output from the probability distribution shaping-decoding processing unit 91-1, the information bit string $dBS_2$ output from the probability distribution shaping-decoding processing unit 91-2, the information bit string $dBS_3$ output from the probability distribution shaping-decoding processing unit 91-3, and the information bit string $dBS_4$ output from the probability distribution shaping-decoding processing unit 91-4.

The information bit string multiplexing unit 92 restores one information bit string BS by multiplexing the information bit string $dBS_1$, the information bit string $dBS_2$, the information bit string $dBS_3$, and the information bit string $dBS_4$.

In the second embodiment described above, the subchannel encoding device 11 illustrated in FIG. 9 is configured so that M×N subchannels are classified into N groups, and the N probability distribution shaping-encoding processing units 72-1 to 72-N determine the probability distributions of the transmission modulation symbols of the subchannels belonging to the respective groups separated by the information bit string separating unit 71 on the basis of the SNR of the subchannel belonging to each group, and converts the information bit strings belonging to the respective groups into the shaped bit strings corresponding to the probability distributions of the respective transmission modulation symbols. Therefore, the subchannel encoding device 11 illustrated in FIG. 9 can increase the information rate in the total of the M×N subchannels without implementing the probability distribution shaping-encoding units as many as the M×N subchannels.

Furthermore, in the second embodiment, the subchannel decoding device 18 illustrated in FIG. 11 is configured so that M×N subchannels are classified into N groups, and each of the N probability distribution shaping-decoding processing units 91-1 to 91-N converts the shaped bit strings into the information bit strings. Therefore, the subchannel decoding device 18 illustrated in FIG. 11 can increase the information rate in the total of the M×N subchannels without implementing the probability distribution shaping-decoding units as many as the M×N subchannels.

Considering the multistage transmission of the optical cross-connect device, among the SNRs of the M×N subchannels, for example, the SNR of the subchannel having the k-th highest center frequency counted from the subchannel having the lowest center frequency is substantially the same as the SNR of the subchannel having the k-th lowest center frequency counted from the subchannel having the highest center frequency.

In addition, SNR distributions in two subchannels adjacent on the frequency axis are similar to each other.

Therefore, for example, when M×N=8, the entropies given to the subchannels $SC_1$, $SC_8$, $SC_2$, and $SC_7$ can be determined depending on the SNR of the subchannel $SC_1$, the SNR of the subchannel $SC_8$, the SNR of the subchannel $SC_2$, or the SNR of the subchannel $SC_7$.

Furthermore, the entropies given to the subchannels $SC_3$, $SC_6$, $SC_4$, and $SC_5$ can be determined depending on the SNR of the subchannel $SC_3$, the SNR of the subchannel $SC_6$, the SNR of the subchannel $SC_4$, or the SNR of the subchannel $SC_5$.

In a case where the entropy given to each of the subchannels $SC_1$ to $SC_8$ is determined as described above, the subchannel encoding device 11 does not need to implement the probability distribution shaping-encoding units as many as the subchannels $SC_1$ to $SC_8$, and it is sufficient that two probability distribution shaping-encoding processing units 72-1 to 72-2 are implemented.

In addition, the subchannel decoding device 18 does not need to implement the probability distribution shaping-decoding units as many as the subchannels $SC_1$ to $SC_8$, and it is sufficient that two probability distribution shaping-decoding processing units 91-1 to 91-2 are implemented.

Third Embodiment

In a third embodiment, a subchannel encoding device 11 in which a plurality of sets of the probability distribution shaping-encoding unit 21 illustrated in FIG. 2 or the probability distribution shaping-encoding processing units 72-1 to 72-N illustrated in FIG. 9, the error correction encoding unit 23, the M×N symbol mapping units 24-1-1 to 24-N-M, and the M×N signal generation processing units 25-1-1 to 25-N-M are connected in parallel will be described.

Furthermore, in the third embodiment, a subchannel decoding device 18 in which a plurality of sets of M×N symbol restoring units 43-1-1 to 43-N-M, M×N logarithmic posterior probability ratio calculating units 44-1-1 to 44-N-M, an error correction decoding unit 45, and a probability distribution shaping-decoding unit 46 illustrated in FIG. 4 or probability distribution shaping-decoding processing units 91-1 to 91-N illustrated in FIG. 11 are connected in parallel will be described.

FIG. 13 is a configuration diagram illustrating a subchannel encoding device 11 according to the third embodiment.

In FIG. 13, the same reference numerals as those in FIGS. 2 and 9 denote the same or corresponding parts, and thus detailed description thereof will be omitted.

When one information bit string BS is given from the outside of the device, the information bit string separating unit 73 separates the one information bit string BS into (G+H) information bit strings.

The information bit string separating unit 73 outputs the G information bit strings among the (G+H) information bit strings to the respective subchannel encoding devices 110-1 to 110-G.

Furthermore, the information bit string separating unit 73 outputs the H information bit strings among the (G+H) information bit strings to the respective subchannel encoding devices 120-1 to 120-H.

Each of the subchannel encoding devices 110-1 to 110-G includes a probability distribution shaping-encoding unit 21 illustrated in FIG. 2, an error correction encoding unit 23 illustrated in FIG. 2, symbol mapping units 24-1-1 to 24-N-M illustrated in FIG. 2, and signal generation processing units 25-1-1 to 25-N-M illustrated in FIG. 2. G is an integer of one or more.

M in each of the subchannel encoding devices 110-1 to 110-G may be different from each other or may be the same. Furthermore, N in each of the subchannel encoding devices 110-1 to 110-G may be different from each other or may be the same.

Each of the subchannel encoding devices 120-1 to 120-H includes an information bit string separating unit 71 illustrated in FIG. 9, probability distribution shaping-encoding processing units 72-1 to 72-N illustrated in FIG. 9, an error correction encoding unit 23 illustrated in FIG. 9, symbol mapping units 24-1-1 to 24-N-M illustrated in FIG. 9, and signal generation processing units 25-1-1 to 25-N-M illustrated in FIG. 9. H is an integer of one or more.

M in each of the subchannel encoding devices 120-1 to 120-H may be different from each other or may be the same. Furthermore, N in each of the subchannel encoding devices 120-1 to 120-H may be different from each other or may be the same.

The subchannel encoding device 11 illustrated in FIG. 13 may include the subchannel encoding devices 110-1 to 110-G or may not include the subchannel encoding devices 110-1 to 110-G as long as H is an integer of two or more.

The subchannel encoding device 11 illustrated in FIG. 13 may include the subchannel encoding devices 120-1 to 120-H or may not include the subchannel encoding devices 120-1 to 120-H as long as G is an integer of two or more.

Figure 14:
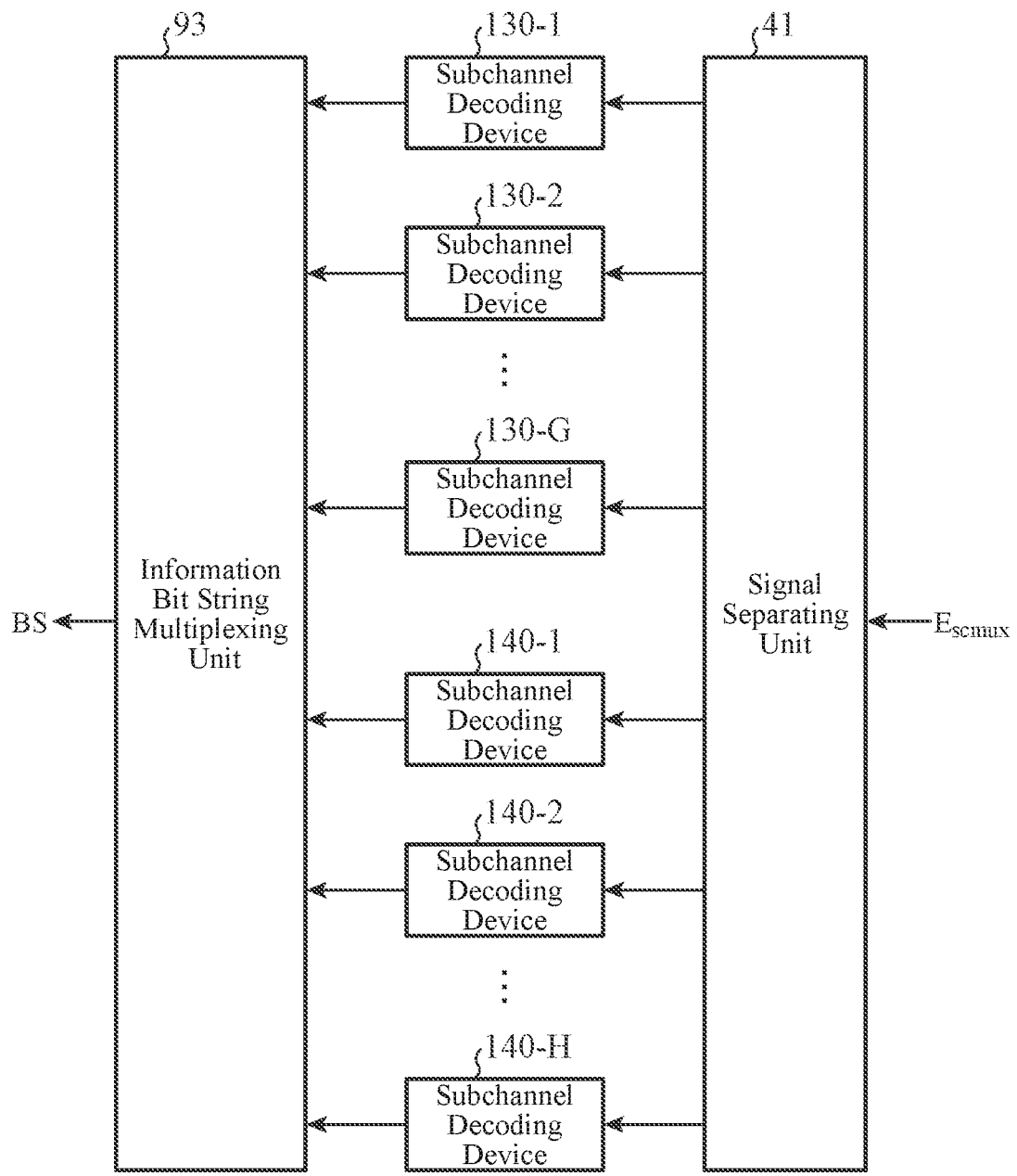
FIG. 14 is a configuration diagram illustrating a subchannel decoding device 18 according to the third embodiment.

FIG. 14 is a configuration diagram illustrating the subchannel decoding device 18 according to the third embodiment.

In FIG. 14, the same reference numerals as those in FIGS. 4 and 11 denote the same or corresponding parts, and thus detailed description thereof will be omitted.

Each of the subchannel decoding devices 130-1 to 130-G includes symbol restoring units 43-1-1 to 43-N-M illustrated in FIG. 4, logarithmic posterior probability ratio calculating units 44-1-1 to 44-N-M illustrated in FIG. 4, an error correction decoding unit 45 illustrated in FIG. 4, and a probability distribution shaping-decoding unit 46 illustrated in FIG. 4.

M in each of the subchannel decoding devices 130-1 to 130-G may be different from each other or may be the same. Furthermore, N in each of the subchannel decoding devices 130-1 to 130-G may be different from each other or may be the same.

Each of the subchannel decoding devices 140-1 to 140-H includes an information bit string multiplexing unit 92 illustrated in FIG. 11, symbol restoring units 43-1-1 to 43-N-M illustrated in FIG. 11, logarithmic posterior probability ratio calculating units 44-1-1 to 44-N-M illustrated in FIG. 11, an error correction decoding unit 45 illustrated in FIG. 11, and probability distribution shaping-decoding processing units 91-1 to 91-N illustrated in FIG. 11.

M in each of the subchannel decoding devices 140-1 to 140-H may be different from each other or may be the same. Furthermore, N in each of the subchannel decoding devices 140-1 to 140-H may be different from each other or may be the same.

An information bit string multiplexing unit 93 restores one information bit string BS by multiplexing the information bit strings output from each of the subchannel decoding devices 130-1 to 130-G and the subchannel decoding devices 140-1 to 140-H.

The subchannel decoding device 18 illustrated in FIG. 14 may include the subchannel decoding devices 130-1 to 130-G or may not include the subchannel decoding devices 130-1 to 130-G as long as H is an integer of two or more.

The subchannel decoding device 18 illustrated in FIG. 14 may include the subchannel decoding devices 140-1 to 140-H or may not include the subchannel decoding devices 140-1 to 140-H as long as G is an integer of two or more.

Next, the operation of the subchannel encoding device 11 illustrated in FIG. 13 will be described.

When one information bit string BS is given from the outside of the device, the information bit string separating unit 73 separates the one information bit string BS into (G+H) information bit strings.

The information bit string separating unit 73 outputs the G information bit strings among the (G+H) information bit strings to the respective subchannel encoding devices 110-1 to 110-G.

Furthermore, the information bit string separating unit 73 outputs the H information bit strings among the (G+H) information bit strings to the respective subchannel encoding devices 120-1 to 120-H.

Each of the error correction encoding unit 23, the symbol mapping units 24-1-1 to 24-N-M, and the signal generation processing units 25-1-1 to 25-N-M included in the subchannel encoding devices 110-1 to 110-G performs the operation described in the first embodiment.

Each of the probability distribution shaping-encoding processing units 72-1 to 72-N, the error correction encoding unit 23, the symbol mapping units 24-1-1 to 24-N-M, and the signal generation processing units 25-1-1 to 25-N-M included in the subchannel encoding devices 120-1 to 120-H performs the operation described in the second embodiment.

The signal multiplexing unit 26 multiplexes the subchannel signals output from each of the subchannel encoding devices 110-1 to 110-G and the subchannel encoding devices 120-1 to 120-H to generate a subchannel multiplexed signal $E_{scmux}$.

The signal multiplexing unit 26 outputs the generated subchannel multiplexed signal $E_{scmux}$ to the conversion amplifier 12.

Next, the operation of the subchannel decoding device 18 illustrated in FIG. 14 will be described.

The signal separating unit 41 receives the subchannel multiplexed signal $E_{scmux}$ output from the amplifier converter 17.

The signal separating unit 41 separates the received subchannel multiplexed signal $E_{scmux}$ into (G+H) subchannel signals.

The signal separating unit 41 outputs G subchannel signals among the (G+H) subchannel signals to the subchannel decoding devices 130-1 to 130-G, respectively.

Further, the signal separating unit 41 outputs H subchannel signals among the (G+H) subchannel signals to the respective subchannel decoding devices 140-1 to 140-H.

Each of the symbol restoring units 43-1-1 to 43-N-M, the logarithmic posterior probability ratio calculating units 44-1-1 to 44-N-M, the error correction decoding unit 45, and the probability distribution shaping-decoding unit 46 included in the subchannel decoding devices 130-1 to 130-G performs the operation described in the first embodiment.

Each of the symbol restoring units 43-1-1 to 43-N-M, the logarithmic posterior probability ratio calculating units 44-1-1 to 44-N-M, the error correction decoding unit 45, and the probability distribution shaping-decoding processing units 91-1 to 91-N included in the subchannel decoding devices 140-1 to 140-H performs the operation described in the second embodiment.

The information bit string multiplexing unit 93 restores one information bit string BS by multiplexing the information bit strings output from each of the subchannel decoding devices 130-1 to 130-G and the subchannel decoding devices 140-1 to 140-H.

In the third embodiment described above, the subchannel encoding device 11 is configured so that a plurality of sets of the probability distribution shaping-encoding unit 21 illustrated in FIG. 2 or the probability distribution shaping-encoding processing units 72-1 to 72-N illustrated in FIG. 9, the error correction encoding unit 23, the M×N symbol mapping units 24-1-1 to 24-N-M, and the M×N signal generation processing units 25-1-1 to 25-N-M are connected in parallel. Therefore, the subchannel encoding device 11 can increase the information rate in the total of all the subchannels without implementing the probability distribution shaping-encoding units as many as all the subchannels.

Furthermore, in the third embodiment, the subchannel decoding device 18 is configured so that a plurality of sets of the M×N symbol restoring units 43-1-1 to 43-N-M, the M×N logarithmic posterior probability ratio calculating units 44-1-1 to 44-N-M, the error correction decoding unit 45, and the probability distribution shaping-decoding unit 46 illustrated in FIG. 4 or the probability distribution shaping-decoding processing units 91-1 to 91-N illustrated in FIG. 11 are connected in parallel. Therefore, the subchannel decoding device 18 can increase the information rate in the total of all the subchannels without implementing the probability distribution shaping-decoding units as many as all the subchannels.

It should be noted that the invention of the present application can freely combine the embodiments, modify any constituent element of each embodiment, or omit any constituent element in each embodiment within the scope of the invention.

INDUSTRIAL APPLICABILITY

The present invention is suitable for a subchannel encoding device and a subchannel encoding method for generating a subchannel multiplexed signal.

In addition, the present invention is suitable for a subchannel decoding device and a subchannel decoding method for restoring an information bit string.

In addition, the present invention is suitable for a subchannel multiplexing optical communication system including a subchannel encoding device and a subchannel decoding device.

REFERENCE SIGNS LIST

1: optical transmission device, 2: optical transmission line, 3: optical reception device, 11: subchannel encoding device, 12: conversion amplifier, 13: transmission light source, 14: optical modulator, 15: reception light source, 16: optical receiver, 17: amplifier converter, 18: subchannel decoding device, 21: probability distribution shaping-encoding unit, 22: subchannel signal generating unit, 23: error correction encoding unit, 24-1-1 to 24-N-M: symbol mapping unit, 25-1-1 to 25-N-M: signal generation processing unit, 26: signal multiplexing unit, 31: probability distribution shaping-encoding circuit, 32: error correction encoding circuit, 33: symbol mapping circuit, 34: signal generation processing circuit, 35: signal multiplexing circuit, 41: signal separating unit, 42: shaped bit string restoring unit, 43-1-1 to 43-N-M: symbol restoring unit, 44-1-1 to 44-N-M: logarithmic posterior probability ratio calculating unit, 45: error correction decoding unit, 46: probability distribution shaping-decoding unit, 51: signal separating circuit, 52: symbol restoring circuit, 53: logarithmic posterior probability ratio calculating circuit, 54: error correction decoding circuit, 55: probability distribution shaping-decoding circuit, 61: memory, 62: processor, 71: information bit string separating unit, 72-1 to 72-N: probability distribution shaping-encoding processing unit, 73: information bit string separating unit, 81: information bit string separating circuit, 82: probability distribution shaping-encoding processing circuit, 91-1 to 91-N: probability distribution shaping-decoding processing unit, 92, 93: information bit string multiplexing unit, 101: probability distribution shaping-decoding processing circuit, 102: information bit string multiplexing circuit, 110-1 to 110-G: subchannel encoding device, 120-1 to 120-H: subchannel encoding device, 130-1 to 130-G: subchannel decoding device, 140-1 to 140-H: subchannel decoding device

The invention claimed is:

1. A subchannel encoding device, comprising:
processing circuitry performing a process of:
separating one information bit string into an information bit string belonging to each of groups wherein M×N (M and N are an integer of two or more) subchannels are classified into N groups;
providing N probability distribution shaping-encoding processors to shape a probability distribution of transmission modulation symbols corresponding to the information bit string belonging to each group separated on a basis of signal-to-noise ratios of the M×N subchannels, and to convert the information bit string belonging to each group into a shaped bit string corresponding to the probability distribution of the shaped transmission modulation symbols;
generating each subchannel signal in the M×N subchannels from the N shaped bit strings; and
multiplexing the M×N subchannel signals generated to generate a subchannel multiplexed signal.

2. A subchannel decoding device, comprising:
processing circuitry performing a process of:
separating a subchannel multiplexed signal into M×N subchannel signals wherein M×N (M and N are an integer of two or more) subchannels are classified into the N groups;
restoring shaped bit strings belonging to each group from the M×N subchannel signals separated; and
providing the N probability distribution shaping-decoders to convert shaped bit strings belonging to each group, restored into information bit strings on a basis of signal to noise ratios of subchannels belonging to each group.

3. A subchannel multiplexing optical communication system, comprising:
a subchannel encoding device comprising:
processing circuitry performing a process of:
separating one information bit string into an information bit string belonging to each of groups wherein M×N (M and N are an integer of two or more) subchannels are classified into N groups;
providing N probability distribution shaping-encoding processors to shape a probability distribution of transmission modulation symbols corresponding to the information bit string belonging to each group separated on a basis of signal-to-noise ratios of the M×N subchannels, and to convert the information bit string belonging to each group into a shaped bit string corresponding to the probability distribution of the shaped transmission modulation symbols;
generating each subchannel signal in the M×N subchannels from the N shaped bit strings; and
multiplexing the M×N subchannel signals generated to generate a subchannel multiplexed signal; and
a subchannel decoding device comprising:
processing circuitry performing a process of:
separating a subchannel multiplexed signal into M×N subchannel signals wherein M×N (M and N are an integer of two or more) subchannels are classified into the N groups;
restoring shaped bit strings belonging to each group from the M×N subchannel signals separated; and
providing the N probability distribution shaping-decoders to convert shaped bit strings belonging to each group, restored into information bit strings on a basis of signal to noise ratios of subchannels belonging to each group.

* * * * *